(12) United States Patent
Thomas et al.

(10) Patent No.: US 8,520,327 B2
(45) Date of Patent: Aug. 27, 2013

(54) OPTICAL ADJUSTMENT MOUNTS WITH PIEZOELECTRIC INERTIA DRIVER

(75) Inventors: Patrick Thomas, Fay aux Loges (FR); Roger Desailly, Vitry aux Loges (FR)

(73) Assignee: Newport Corporation, Irvine, CA (US)

(*) Notice: Subject to any disclaimer, the term of this patent is extended or adjusted under 35 U.S.C. 154(b) by 426 days.

(21) Appl. No.: 12/065,083

(22) PCT Filed: Jan. 18, 2007

(86) PCT No.: PCT/IB2007/000602
§ 371 (c)(1),
(2), (4) Date: Aug. 2, 2010

(87) PCT Pub. No.: WO2008/087469
PCT Pub. Date: Jul. 24, 2008

(65) Prior Publication Data
US 2010/0290138 A1   Nov. 18, 2010

(51) Int. Cl.
*G02B 7/02* (2006.01)

(52) U.S. Cl.
USPC .......................................... 359/811; 359/824

(58) Field of Classification Search
USPC ................................................ 359/811–824
See application file for complete search history.

(56) References Cited

U.S. PATENT DOCUMENTS

| | | |
|---|---|---|
| 3,320,580 A | 5/1967 | Sykes |
| 3,902,085 A | 8/1975 | Bizzigotti |
| 4,019,073 A | 4/1977 | Vishnevsky et al. |
| 4,453,103 A | 6/1984 | Vishnevsky et al. |
| 4,525,852 A | 6/1985 | Rosenberg |
| 4,594,584 A | 6/1986 | Pfeiffer et al. |
| 4,607,166 A | 8/1986 | Tamaki |
| 4,613,782 A | 9/1986 | Mori et al. |
| 4,622,483 A | 11/1986 | Staufenberg, Jr. et al. |
| 4,647,808 A | 3/1987 | Shibuya |
| 4,714,855 A | 12/1987 | Fujimoto |
| 4,727,278 A | 2/1988 | Staufenberg, Jr. et al. |
| 4,775,815 A | 10/1988 | Heinz |
| 4,831,306 A | 5/1989 | Staufenberg, Jr et al. |
| 4,857,793 A | 8/1989 | Okuno |
| 4,918,351 A | 4/1990 | Kawai |
| 4,933,590 A | 6/1990 | Inoue et al. |
| 4,975,615 A | 12/1990 | Katahara |
| 5,017,820 A | 5/1991 | Culp |
| 5,027,028 A | 6/1991 | Skipper |
| 5,034,647 A | 7/1991 | Ohtsuka |
| 5,059,850 A | 10/1991 | Yoshimura et al. |
| 5,079,471 A | 1/1992 | Nygren, Jr. |

(Continued)

FOREIGN PATENT DOCUMENTS

| WO | WO 2008/087469 | 7/2008 |
|---|---|---|
| WO | WO 2012/009379 | 1/2012 |

OTHER PUBLICATIONS

International Search Report and Written Opinion for PCT/IB07/00602, Mailed: Aug. 20, 2008.

(Continued)

*Primary Examiner* — James Jones
(74) *Attorney, Agent, or Firm* — Grant Anderson LLP

(57) ABSTRACT

Embodiments include optic mounts that may be adjustably positioned with a piezoelectric inertia driver. Position data feedback may be provided to embodiments of a piezoelectric inertia driver controller from an encoder, such as an optical encoder.

57 Claims, 12 Drawing Sheets

(56) References Cited

U.S. PATENT DOCUMENTS

| | | | |
|---|---|---|---|
| 5,140,470 | A | 8/1992 | Luecke |
| 5,394,049 | A | 2/1995 | Luecke |
| 5,410,206 | A | 4/1995 | Luecke et al. |
| 5,543,670 | A * | 8/1996 | Luecke ........................... 310/26 |
| 6,232,700 | B1 * | 5/2001 | Kosaka et al. ............ 310/323.17 |
| 7,119,478 | B1 * | 10/2006 | Mentesana .................... 310/328 |
| 2003/0059194 | A1 | 3/2003 | Trzecieski |
| 2004/0124744 | A1 * | 7/2004 | Pease et al. ................... 310/317 |
| 2004/0124747 | A1 * | 7/2004 | Bugel et al. ................... 310/328 |
| 2006/0169837 | A1 | 8/2006 | Bird et al. |
| 2009/0127974 | A1 | 5/2009 | Piotr et al. |
| 2010/0118421 | A1 | 5/2010 | Woodard et al. |
| 2012/0013999 | A1 | 1/2012 | Thomas et al. |

OTHER PUBLICATIONS

Agrait, Vertical Inertial Piezoelectric translation device for a scanning tunneling microscope, Rev. Sci. Instrum., Jan. 1992; 63(1):263-264.

Definition of Magnetostriction, printed from the internet on Oct. 9, 2006 located at: http://en.wikipedia.org/wiki/Magnetostriction.

Definition of Piezoelectricity, printed from the internet on Oct. 9, 2006. located at: http://en.wikipedia.org/wiki/Piezoelectricity.

Howald et al, Piezoelectric Inertial Stepping Motor and Spherical Rotor, Rev. Sci. Instrum., 63(8):3909-3912 1992.

Magnetostriction and Magnetostrictive materials, Printed from the internet on Oct. 9, 2006, located at: http://aml.seas.ucla.edu/research/areas/magnetostrictive/mag-composites/Magnetostriction%20and%20Magnetostrictive%20Materials.

Skipper, Piezoelectric Traction Motor Delivers High Torque, High Power at Low Speed, PCIM Jun. 1992 36-40.

International Search Report and Written Opinion mailed on: Aug. 20, 2008 in International Application No. PCT/IB2007/00602 filed on Jan. 18, 2007 and published as WO 08/087469 on Jul. 24, 2008.

International Preliminary Report on Patentability mailed on: Jul. 30, 2009 in International Application No. PCT/IB2007/00602 filed on Jan. 18, 2007 and published as WO 08/087469 on Jul. 24, 2008.

Agrait, Vertical Inertial Piezoelectric translation device for a scanning tunneling microscope, Rev. Sci. Instrum., 63(1):263-264.

Definition of Magnetostriction, http://en.wikipedia.org/wiki/Magnetostriction.

Definition of Piezoelectricity, http://en.wikipedia.org/wiki/Piezoelectricity.

Magnetostriction and Magnetostrictive materials, http://aml.seas.ucla.edu/research/areas/magnetostrictive/mag-composites/Magnetostriction%20and%20Magnetostrictive%20Materials.

International Preliminary Report on Patentability mailed on: Jan. 15, 2013 9, 2012 in International Application No. PCT/US2011/043754 filed on Jun. 12, 2011 and published as WO 12/009379 on Jan. 19, 2012.

International Search Report and Written Opinion mailed on: Feb. 9, 2012 in International Application No. PCT/US2011/043754 filed on Jun. 12, 2011 and published as WO 12/009379 on Jan. 19, 2012.

Office Action dated: Mar. 25, 2013 in U.S. Appl. No. 13/181,444, filed: Jul. 12, 2011 and published as: 2012/00133999 on: Jan. 19, 2012.

Office Action dated: Oct. 24, 2012 in U.S. Appl. No. 13/181,444 filed, Jul. 12, 2011 and published as: 2012/00133999 on: Jan. 19, 2012.

* cited by examiner

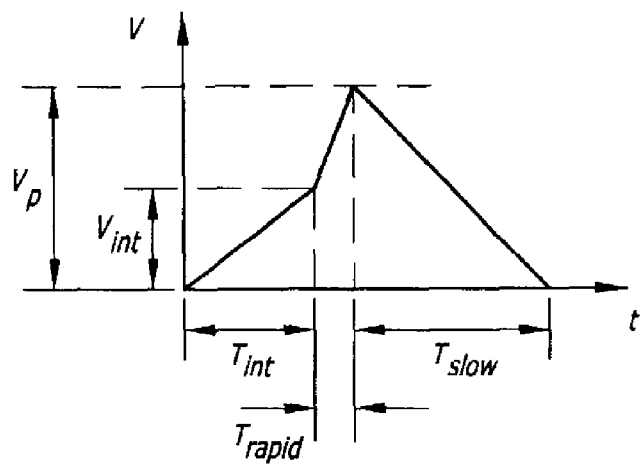
FIG. 5A
FIG. 5B
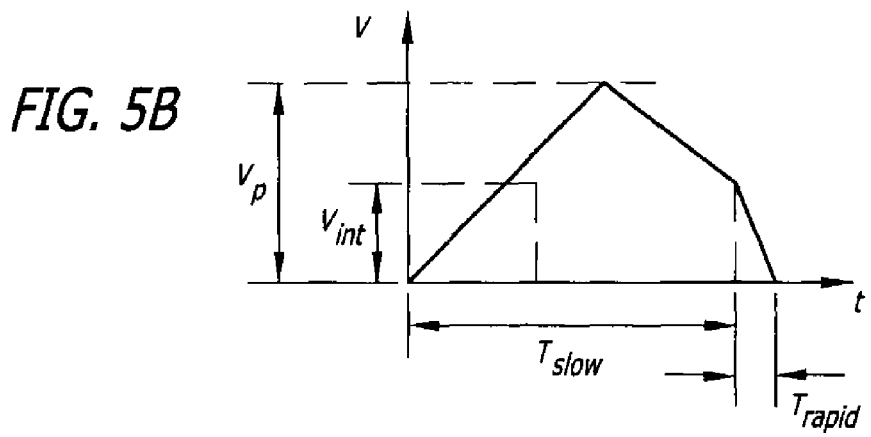
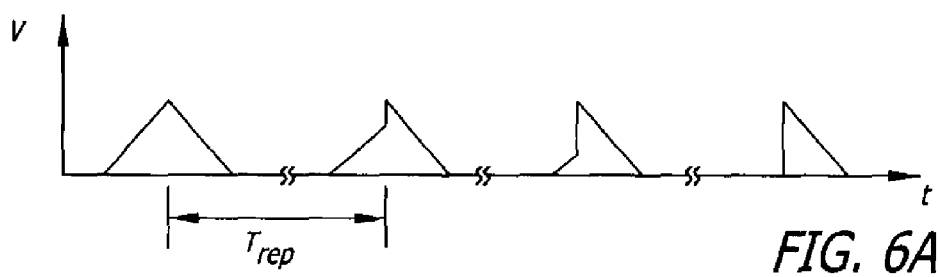
FIG. 6A
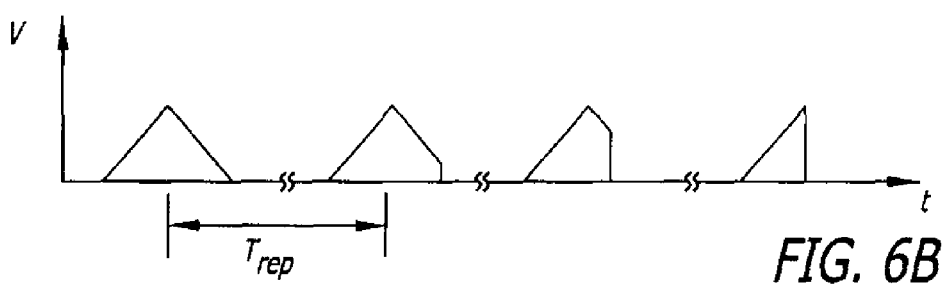
FIG. 6B

OPTICAL ADJUSTMENT MOUNTS WITH PIEZOELECTRIC INERTIA DRIVER

RELATED APPLICATIONS

This application is a national stage application under 35 U.S.C. section 371 of and claims priority from international patent application number PCT/IB2007/000602, filed on Jan. 18, 2007, entitled "OPTICAL ADJUSTMENT MOUNTS WITH PIEZOELECTRIC INERTIA DRIVER", naming Patrick Thomas and Roger Desailly as inventors, which is incorporated by reference herein in its entirety.

BACKGROUND

Optical devices or elements such as lenses, mirrors, wave plates, filters, volume Bragg gratings, prisms and the like are often mounted to an optical system, and particularly an experimental optical system, with an adjustable optical mount. An example of an optical system may include an optical bench or base having multiple optical devices and components mounted to the base with an orientation so as to provide an optical path which directs a light beam from one optical device to the next. Beams from lasers or other light sources are generally used for such applications. For such arrangements, an adjustable optical mount provides a mechanism to securely fasten an optical element to the optical bench or other component of the optical system and still allow for some adjustment of the orientation of the optical element.

Existing adjustable optical mounts may include embodiments having a first plate configured to have an optical element secured thereto. A second plate is disposed adjacent the first plate and includes three contact points extending from the second plate to the first plate. One or more of the contact points may be disposed on the end of an adjustment shaft, such as an adjustment screw, which is threaded to the second plate. The contact points may also be disposed in a detent on the first plate which allows rotation of the contact point relative to the first plate, but prevents the contact point from sliding or being transversely displaced along the first plate. One or more retractive members, such as springs or magnets, are fastened between the first and second plates so as to force the plates to be drawn together with the restorative force of the spring, springs, magnet or magnets. The attractive force generated by the retractive members between the plates is resisted by the three contact points against the respective detents of the first plate.

In such an arrangement, rotation of an adjustment screw moves the adjustment screw relative to the second plate in order to adjust the separation between the plates at the adjustment screw position and thus the relative orientation of the first plate to the second plate. If a fine screw thread is used for the adjustment screw, fine adjustment of the orientation of the first plate and optical element can be made with respect to the second plate. The second plate is generally configured to be securely mounted to a base of an optical system with a flange, clearance hole, threaded hole or the like. Once the second plate is securely fastened to the optical bench or base, the adjustable optical mount allows the optical element secured to the first plate to be secured to the base of the optical system with fine adjustment of the orientation of the optical element relative to an optical path of the optical system.

One of the shortcomings of such an arrangement is that the manual manipulation of one adjustment screw may disturb other adjustment screws or move the entire optical mount structure. Such systems may also be adjusted with remote electric motors, such as stepper motors, however, these types of motors tend to be bulky and expensive and may require complicated reduction gearing as well as other refinements. What has been needed are optical mounts having a compact and remote adjustment means that enable precision control of the position of an optical element in a desired axis.

SUMMARY

Some embodiments of a piezoelectric inertia driver for optical adjustment include a rigid body portion having a first piezoelectric member mount surface and a continuous and flexible resilient member having a first end which includes a second piezoelectric member mount surface, a drive surface portion having a drive surface, an axially rigid portion disposed between and secured to the drive surface portion and the first end, an S-shaped resilient portion extending from the drive surface portion, and a second end portion disposed between and secured to the S-shaped resilient portion and the body portion. A piezoelectric member is disposed between and secured to the first and second mount surfaces.

Some embodiments of a mount for optical adjustment include a first mount body and a second mount body which is configured to secure an optical element thereto and which is movable relative to the first mount body in at least one adjustable degree of freedom. The mount also includes a piezoelectric inertia driver configured to impart relative movement in the adjustable degree of freedom between the first mount body and the second mount body. The piezoelectric inertia driver includes a rigid body portion having a first piezoelectric member mount surface, a continuous and flexible resilient member having a first end which includes a second piezoelectric member mount surface, a drive surface portion having a drive surface, an axially rigid portion disposed between and secured to the drive surface portion and the first end, an S-shaped resilient portion extending from the drive surface portion, and a second end portion disposed between and secured to the S-shaped resilient portion and the body portion. The piezoelectric inertia driver also includes a piezoelectric member disposed between and secured to the first and second mount surfaces.

Some embodiments of a mount for optical adjustment include a first mount body and a second mount body which is configured to secure an optical element thereto, which pivots relative to the first mount body at a pivot point disposed between the first mount body and second mount body and which has a first drive surface with a constant radius of curvature relative to the pivot point and a second drive surface with a constant radius of curvature relative to the pivot point. A first piezoelectric inertia driver is configured to impart relative movement between the first mount body and the second mount body in a first axis direction, and includes a drive surface which is frictionally engaged with the first drive surface of the second mount body. A second piezoelectric inertia driver is configured to impart relative movement between the first mount body and the second mount body in a second axis direction, and includes a drive surface which is frictionally engaged with a second drive surface of the second mount body.

Some embodiments of a mount for optical adjustment include a first mount body and a second mount body which is configured to secure an optical element thereto, which pivots relative to the first mount body at a pivot point disposed between the first mount body and second mount body and which has a first drive surface with a substantially constant radius of curvature relative to the pivot point and a second drive surface which has a substantially constant radius of curvature relative to the pivot point. The mount also includes a first piezoelectric inertia driver configured to impart relative movement between the first mount body and the second mount body in a first axis direction. The first piezoelectric inertia driver includes a rigid body portion which is secured to the first mount body and which has a first piezoelectric member mount surface, a continuous and flexible resilient member having a first end which includes a second piezoelectric member mount surface, a drive surface portion having a drive surface which is frictionally engaged with the first drive surface of the second mount body, an axially rigid portion disposed between and secured to the drive surface portion and the first end, an S-shaped resilient portion extending from the drive surface portion, and a second end portion disposed between and secured to the S-shaped resilient portion and the body portion. The first piezoelectric inertia driver also includes a piezoelectric member disposed between and secured to the first and second mount surfaces.

The mount embodiment also includes a second piezoelectric inertia driver configured to impart relative movement between the first mount body and the second mount body in a second axis direction. The second piezoelectric inertia driver includes a rigid body portion secured to the first mount body and has a first piezoelectric member mount surface. The second piezoelectric inertia driver also includes a continuous and flexible resilient member having a first end which includes a second piezoelectric member mount surface, a drive surface portion having a drive surface which is frictionally engaged with the second drive surface of the second mount body, an axially rigid portion disposed between and secured to the drive surface portion and the first end, an S-shaped resilient portion extending from the drive surface portion, and a second end portion disposed between and secured to the S-shaped resilient portion and the body portion. A piezoelectric member is disposed between and secured to the first and second mount surfaces of the second piezoelectric inertia driver.

Some embodiments of a rotary mount for optical adjustment include a first mount body and a second mount body which is configured to secure an optical element thereto and which rotates about a single axis of rotation relative to the first mount body in a rotational direction. The rotary mount also includes a piezoelectric inertia driver configured to impart relative rotational movement between the first mount body and the second mount body in the rotational direction. The piezoelectric inertia driver includes a rigid body portion which is secured to the first mount body and which has a first piezoelectric member mount surface. The piezoelectric inertia driver also includes a continuous and flexible resilient member having a first end with a second piezoelectric member mount surface, a drive surface portion having a drive surface which is frictionally engaged with the second mount body, an axially rigid portion disposed between and secured to the drive surface portion and the first end, an S-shaped resilient portion extending from the drive surface portion, and a second end portion disposed between and secured to the S-shaped resilient portion and the body portion. A piezoelectric member is disposed between and secured to the first and second mount surfaces.

Some embodiments of a translation mount for optical adjustment include a first mount body and a second mount body which is configured to secure an optical element thereto and which translates relative to the first mount body in a linear direction. The translation mount also includes a piezoelectric inertia driver configured to impart relative linear movement between the first mount body and the second mount body in the linear direction. The piezoelectric inertia driver includes a rigid body portion which is secured to the first mount body and which has a first piezoelectric member mount surface. The piezoelectric inertia driver also includes a continuous and flexible resilient member having a first end with a second piezoelectric member mount surface, a drive surface portion having a drive surface which is frictionally engaged with the second mount body, an axially rigid portion disposed between and secured to the drive surface portion and the first end, an S-shaped resilient portion extending from the drive surface portion, and a second end portion disposed between and secured to the S-shaped resilient portion and the body portion. A piezoelectric member is disposed between and secured to the first and second mount surfaces.

These features of embodiments will become more apparent from the following detailed description when taken in conjunction with the accompanying exemplary drawings.

BRIEF DESCRIPTION OF THE DRAWINGS

FIGS. 3A-6B are graphical representations of various voltage signals and signal pulses that may be used to drive embodiments of a piezoelectric inertia driver.

DETAILED DESCRIPTION

Embodiments discussed herein are directed to compact motorized driving mechanisms, including piezoelectric inertia drivers, for use with mounts for optical adjustment. Such mounts may be configured to have little or no angular range limitations, an availability of a central aperture through the mounts, positional stability in case of a loss of power to the mount, a good sensitivity and low cost relative to other motorized adjustable mounts for optical adjustment. Such a motorized driving mechanism in the form of a piezoelectric inertia driver may be used in a wide variety of mounts for optical adjustment, including rotary mounts such as rotation stages, kinematic optical mounts, and translation mounts which may include translation stages and the like. Such mounts may be particularly useful in situations that require the use of multiple optical elements that need to be regularly tuned or aligned. In addition, the ability of such mounts to retain positional stability when powered off allows a single controller to be used to adjust multiple mounts with the use of switch box, or the like, which may further decrease the cost of control electronics for an optical system. The mounts may be used to mount and adjust optical devices or elements such as lenses, mirrors, wave plates, filters, volume Bragg gratings, prisms and the like.

Figure 1:
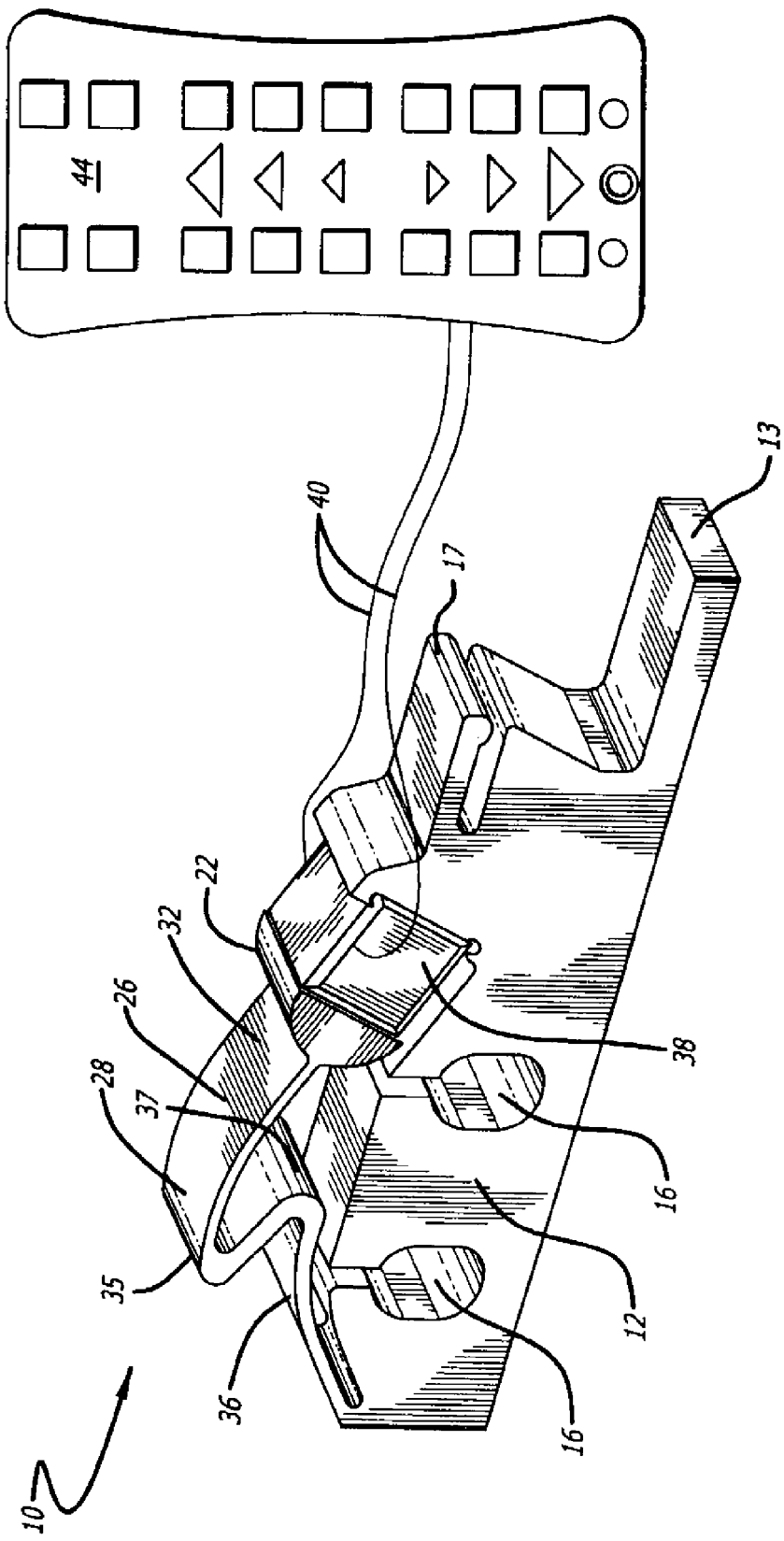
FIG. 1 is a perspective view of an embodiment of a piezoelectric inertia driver for optical adjustment.
Figure 2:
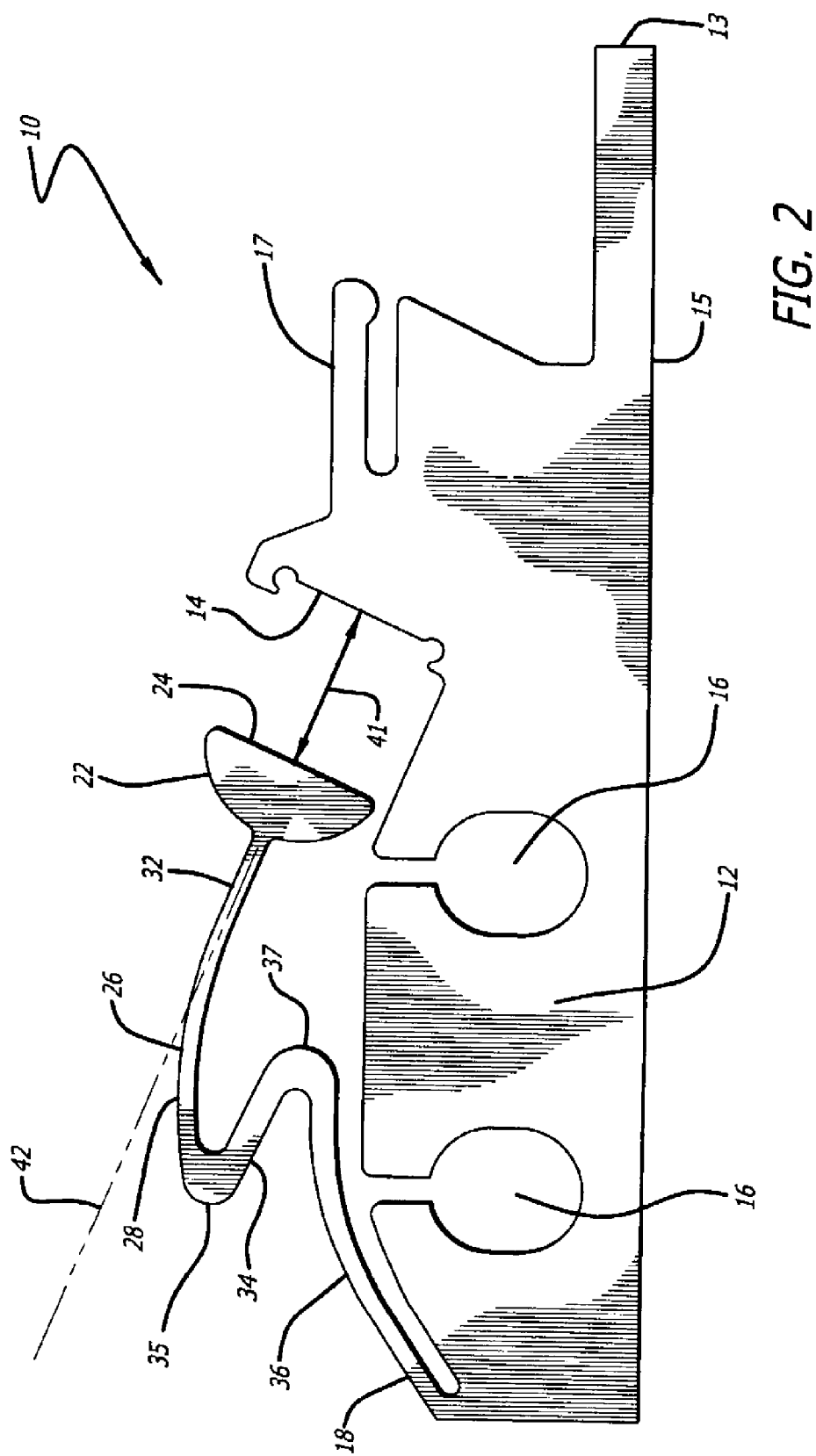
FIG. 2 is an elevational view of the piezoelectric inertia driver embodiment for optical adjustment of FIG. 1 without the piezoelectric member.

Referring to FIGS. 1 and 2, a piezoelectric inertia driver embodiment 10 for optical adjustment is shown. The piezoelectric inertia driver 10 includes a rigid body portion 12 having a first piezoelectric member mount surface 14 disposed towards a first end 13 of the rigid body portion 12 at an angle of about 20 degrees to about 30 degrees from perpendicular with a flat bottom surface 15 of the rigid body portion 12. The rigid body portion 12 includes two mounting slots 16 that may be used to secure the rigid body portion 12 to a mount or portion thereof, with suitable screws, bolts, rivets or the like. Although mounting slots 16 are shown, other suitable mounting fixtures for the rigid body portion 12 may also be used, such as mounting holes, which may or may not be threaded, grooves and the like. A wiring mount boss 17 extends adjacent the first end 13 of the rigid body portion for securing any wiring in communication with the piezoelectric inertia driver 10.

The piezoelectric inertia driver 10 also includes a continuous and flexible resilient member 18 having a first end 22 which includes a second piezoelectric member mount surface 24, a drive surface portion 26 having a drive surface 28 and an axially rigid portion 32 disposed between and secured to the drive surface portion 26 and the first end 22. An S-shaped resilient portion 34 extends from the drive surface portion 26 and a second end portion 36 is disposed between and secured to the S-shaped resilient portion 34 and the rigid body portion 12. The second piezoelectric mount surface 24 is substantially parallel and disposed opposite to the first piezoelectric member mount surface 14. The resilient member, which has a ribbon-like configuration with a rectangular transverse cross section, extends from the first end 22 away from the first end 13 of the rigid body portion 12 in an angular orientation that is substantially perpendicular to the first and second piezoelectric mount surfaces 14 and 24. The portion of the flexible resilient member 18 that extends from the first end 22 to the drive surface portion 26 forms the axially rigid or drive force transfer portion 32. The axially rigid portion transmits drive force from the first end 22 to the drive surface 28 which is disposed on the drive surface portion 26. The drive surface 28 is the portion of the resilient member that extends the furthest from the bottom surface 15 of the rigid body portion 12 in a direction perpendicular to the bottom surface 15. This allows the drive surface 28 to engage a surface of a body to be moved or otherwise driven by the piezoelectric driver 10.

The driving force at the first end 22 of the resilient member is generated by a piezoelectric member 38 which is disposed between and secured to the first and second piezoelectric member mount surfaces 14 and 24. In a relaxed state without the piezoelectric member 38 in place, the inner space between the first mount surface 14 and second mount surface 24, as indicated by arrow 41, may be smaller than a corresponding outer dimension of the piezoelectric member 38 to be disposed therein, for some embodiments. This configuration provides a preload compression on the piezoelectric member 38 once it is secured in place between the first and second mount surfaces 14 and 24. For some embodiments, the inner space between the first mount surface 14 and second mount surface 24, as indicated by arrow 41, may be about the same size as the corresponding outer dimension of the piezoelectric member 38. For such embodiments, axial preload compression on the piezoelectric member 38 may be generated by a compression force exerted against and substantially perpendicular to the drive surface 28. The first and second mount surfaces 14 and 24 may be recessed so as to mechanically capture the piezoelectric member 38 in at least one transverse dimension relative to a longitudinal axis 42 of the axially rigid portion 32 of the resilient member 18 disposed between and secured to the drive surface portion 26 and the first end 22. The piezoelectric member 38 may be secured to the first and second mount surfaces 14 and 24 by mechanical capture, bonding by glues, epoxies and the like, welding, brazing, soldering or any other suitable method that will provide for both compression and tension stability of the joints along the longitudinal axis 42 of the axially rigid portion 32 of the resilient member 18. The resilient member 18 may be configured to maintain permanently a calibrated contact friction load through the drive surface 28 to an adjacent surface.

The S-shaped resilient portion 34 which extends between the drive surface portion 26 and second end portion 36 of the flexible resilient member 18 is configured to resiliently resist and counter frictional drive force applied to the drive surface 28 of the flexible resilient member 18. In addition, the S-shaped portion 34 is also configured to cancel torque that might otherwise be imparted from the flexible resilient member 18 to the piezoelectric member 38. In the embodiment shown, the S-shaped portion bends under the drive surface portion 26 and back towards the first end 22 from a first bend 35. A second bend 37 redirects the S-shaped portion 34 back again towards the second end portion 36 and the junction between the second end portion 36 and the rigid body portion 12. The first and second bends 35 and 37 of the S-shaped portion may have bend angles of about 250 degrees to about 330 degrees from a nominal longitudinal axis of the flexible resilient member 18, for some embodiments. For some embodiments, the length of the portion of the S-shaped portion between the first and second bends 35 and 37 may be about 2 mm to about 4 mm. The inside radius of curvature of the first and second bends 35 and 37 may be about 2 mm to about 4 mm for some embodiments.

In the embodiment shown, the rigid body portion 12 and the flexible resilient member 18 have a monolithic structure formed from a single piece of resilient material. For some embodiments, the single piece of resilient material may be a resilient metal, such as spring steel, stainless steel or the like. Because the rigid body portion 12 and the flexible resilient member 18 are made from a single piece of material, the junction between the second end portion 36 and the rigid body portion 12 is such that torque and axial forces may be transmitted between the second end portion 36 of the flexible resilient member 18 and the rigid body portion 12. Although the flexible resilient member 18 is shown as having a substantially ribbon-like configuration with a rectangular transverse cross section, the resilient member may also have other configurations, including transverse cross sections that are square, round, oblong or the like.

Embodiments of the piezoelectric inertia driver 10 may have a length of about 10 mm to about 100 mm and a width of about 2 mm to about 10 mm. Embodiments of the flexible resilient member 18 may have thickness of about 0.2 mm to about 1 mm. The piezoelectric member 38 for such embodiments be generally rectangular in shape and may have a length of about 1 mm to about 10 mm, a width of about 1 mm to about 10 mm and a thickness of about 1 mm to about 10 mm. Some embodiments of the piezoelectric member 38 are substantially cubic in shape, as shown. The piezoelectric element may also have other outer shape configurations such as cylindrical, hexagonal and the like. The compressive axial preload on the piezoelectric member 38 between the first and second mount surfaces 14 and 24 may be about 10 Newtons to about 50 Newtons, for some embodiments having a frictional force substantially perpendicular to the drive surface 28 of about 20 Newtons to about 60 Newtons. Such embodiments may generate an axial drive force in a direction tangent to the drive surface 28 of about 1 Newton to about 5 Newtons. The piezoelectric member 38 may include piezoelectric crystals, piezoelectric ceramics or any other suitable material that changes outer dimensions based on the application of an external field or signal such as an electrical signal.

Although the embodiments discussed herein are shown with piezoelectric members 38, it should be understood that a magnetostrictive member having similar dimensions and operating parameters as the piezoelectric member 38 may be substituted for the piezoelectric member 38 for some embodiments of an inertial driver having the same or similar materials, dimensions and operating characteristics overall as those of the piezoelectric inertia-driver 10. If a variable magnetic field signal can be applied to such a magnetostrictive member so as to produce the type of ramped periodic movement discussed below with respect to FIGS. 3A-6B, the operation of such a magnetostrictive inertia driver may be substantially the same as that of the piezoelectric inertia driver 10.

A piezoelectric inertia driver system includes a controller 44 electrically coupled to the piezoelectric inertia driver 10 by conductors 40. Embodiments of the controller 44 may include a power source, a CPU, external controls for data input, a graphical display and any other electrical circuitry necessary to allow a user to program or otherwise control the actuation of the piezoelectric inertia driver 10. The driver 10 may be used to move mounts for optical adjustment, or portions thereof, by applying movement of varying velocity from the drive surface 28. When a specific voltage profile is applied by the controller 44 to the piezoelectric member 38, extensions and contractions of the piezoelectric member 38 along a direction of the longitudinal axis 42 of the axially rigid portion 32 of the flexible resilient member 18 are generated to the drive surface 28. The resulting motion profile is transferred to a desired portion of a mount so that a highly sensitive and repeatable motion can directly be achieved with reduction in size, number of parts, weight and cost.

Referring to FIGS. 3A-6B, some embodiments of various voltage signal profiles are shown. The voltage signal profiles indicate the magnitude and polarity of voltage applied to the piezoelectric member 38 versus time that may be used to generate movement of the drive surface 28. For such voltage signal profiles, a slow change in applied voltage results in a corresponding slow movement and low acceleration of the drive surface 28. Due to a spring preload of the drive surface 28 of the piezoelectric inertia driver 10 against a body, such as a mount body, a slow translation of the drive surface 28 with low acceleration may be used to generate corresponding movement in a movable mount body which is in frictional engagement with the drive surface 28. By contrast, a relatively rapid increase or decrease in voltage and high level of acceleration of the drive surface 28 will break the frictional engagement of the drive surface 28 and mount body if the moving portion of a mount has sufficient intrinsic inertia. As such, for this high acceleration, the drive surface 28 slips past the moving portion of the mount without substantial translation thereof. When a non-symmetric tension or voltage profile is applied to the piezoelectric member 38, the singular or periodic combination of quick changes in voltage and slow changes in voltage, and corresponding movement of the drive surface 28, can be used to achieve precise movement of the moving portion of a mount in both directions, with no loss of stability during a power shutdown and no range of movement limitation.

Figure 3A:
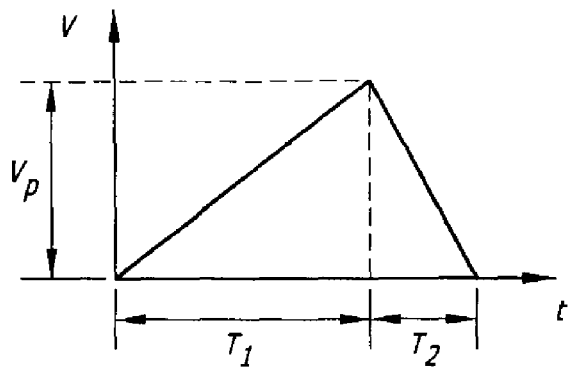
Figure 3B:
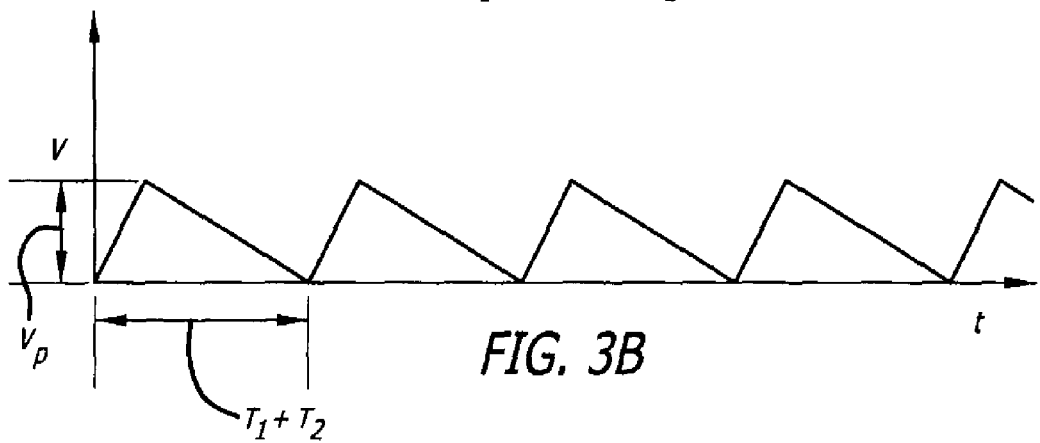

Referring to FIG. 3A, a basic driver voltage pattern or signal pulse that may be applied to the piezoelectric member 38 is shown having a voltage that ramps up relatively slowly to a peak voltage indicated by arrow $V_P$ over time period $T_1$. This slow ramping up of the voltage signal may be used to generate movement in a mount body that may correspond to the total change in voltage during the slow ramping period or the signal pulse. After reaching the peak voltage, the voltage abruptly drops back to the starting voltage over a short period of time, indicated by $T_2$. The abrupt change in voltage over the time period $T_2$ causes high acceleration of the drive surface 28 and slippage between the drive surface 28 and a mount body in frictional engagement with the drive surface 28. This entire cycle takes place over a time period $T_1+T_2$, which may then be repeated, as shown in FIG. 3B. The voltage signal pulse of FIG. 3A may be repeated as many times as necessary to achieve a desired amount of movement of the mount body relative to the piezoelectric inertia driver 10.

Figure 4A:
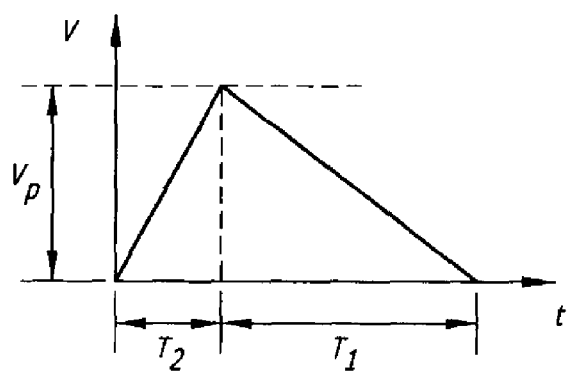
Figure 4B:
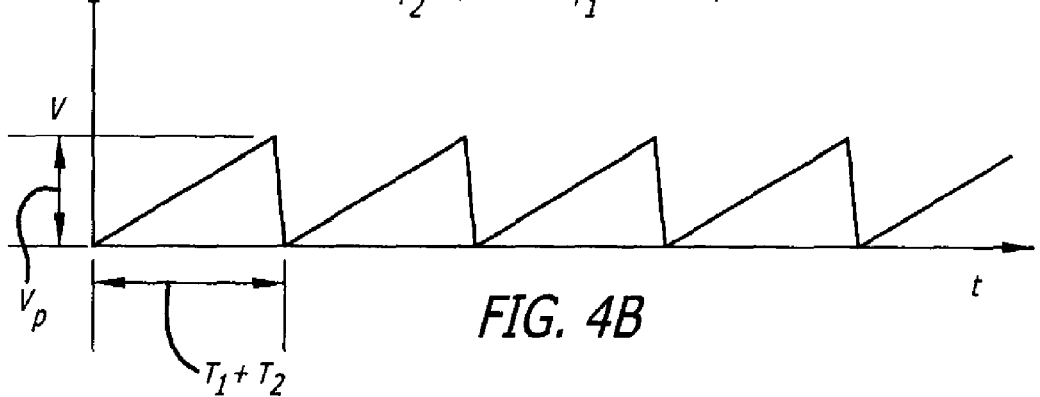

FIG. 4A shows a voltage signal profile similar to that of FIG. 3A, however, the pattern of FIG. 4A is configured to generate movement in the opposite direction of movement generated by the signal of FIG. 3A. In FIG. 4A, the voltage signal abruptly or rapidly ramps up from a starting voltage to the peak voltage $V_P$ over time period $T_2$. As with the voltage signal discussed above, the rapid or abrupt increase in voltage over time period $T_2$ causes slippage in the frictional engagement between the drive surface 28 and a mount body. As such, the mount body will not follow the motion of the drive surface 28 over this portion of the voltage signal cycle. The voltage then slowly ramps down from the peak voltage $V_P$ over time period $T_1$ to the starting voltage. The slower decrease in voltage results in movement of the movable portion of the mount body which is substantially the same as the movement of the drive surface 28 over this portion of the voltage signal. This drive signal shown in FIG. 4A may be repeated as many times as necessary to achieve a desired amount of mount body movement relative to the piezoelectric inertia driver 10. FIG. 4B shows a series of pulses similar to the drive signal pulse in FIG. 4A. Peak voltage $V_P$ for some voltage signal pulse embodiments may be about 10 Volts to about 200 Volts, more specifically, about 10 Volts to about 50 Volts. For some embodiments, the period $T_1+T_2$ of the voltage signal pulses may be about 0.1 msec to about 2.0 msec and the period T2 for the rapid or abrupt voltage change portion or the pulse alone may be about 50 nsec to about 5 microsecond.

The amount of movement generated between the piezoelectric inertia driver 10 and a mount body in frictional engagement with the drive surface 28 of the driver 10 may be varied and controlled in a variety of ways. For a given voltage signal profile, the amount of movement may be controlled by controlling the number of signal pulses, such as the voltage signal pulses of FIGS. 3A and 4A, delivered to the piezoelectric element. Because each voltage signal pulse corresponds to a substantially fixed amount of movement, the number of pulses delivered will be proportional to the total amount of movement generated by the pulses. For a fixed number of voltage signal pulses, the amount of movement may be controlled by controlling the magnitude of the change in voltage from the start to the finish of the voltage signal pulse cycle. For example, if the peak voltage $V_P$ of the voltage signal pulses shown in FIGS. 3A and 4A was reduced by one half, with the voltage signal profile maintaining the same shape and configuration, the amount of movement generated by such a voltage signal pulse would be accordingly reduced.

For some controller embodiments it may be desirable, in order to keep manufacturing costs to a minimum, to design the controller to deliver voltage signal pulses which all have a substantially constant peak voltage $V_P$ to a piezoelectric inertia driver 10. For such systems, the amount of movement generated by each voltage signal pulse may be controlled by controlling the change in voltage signal over the rapid rise or drop segment in voltage signal profile. A voltage signal pulse shown in FIG. 5A has a profile configuration which ramps up slowly to an intermediate voltage $V_{int}$ between the start voltage and the peak voltage. $V_P$ over a time period $T_{int}$. During the time period $T_{int}$, the mount body in frictional engagement with the drive surface 28 of the piezoelectric inertia driver 10 moves with the drive surface 28. Upon reaching the intermediate voltage $V_{int}$, the signal voltage abruptly increases to the peak voltage $V_P$ over time period $T_{rapid}$. During the time period Trapid, slippage occurs between the mount body and the drive surface, as discussed above, and the mount body has minimal movement during this period.

Upon reaching the peak voltage $V_P$, the voltage then ramps back down slowly over time period $T_{slow}$ to the starting voltage during which the mount body is once again moving with the drive surface 28. As such, the signal pulse profile of FIG. 5A generates less overall displacement between the mount body and the piezoelectric inertia driver 10 than would a pulse signal configured as that of FIG. 4A having a comparable peak voltage $V_P$. FIG. 5B shows a similar reduced displacement signal profile, but in a motion direction opposite to that of FIG. 5A. The signal pulse profile of FIG. 5B includes a slow voltage rise to the peak voltage $V_P$ and slow decrease in voltage back down to $V_{int}$ over time period $T_{slow}$. Upon reaching the voltage of the pulse then drops abruptly back to the start voltage over time period $T_{rapid}$. As such, the signal pulse profile of FIG. 5B generates much less overall displacement between the mount body and the piezoelectric inertia driver 10 than would a pulse signal configured as that of FIG. 3A having a comparable peak voltage $V_P$.

The amount of precision that an operator using a controller embodiment 44 and the voltage signal profiles discussed herein may be affected by the magnitude of movement generated from each voltage signal pulse delivered, but may also be affected by the number of pulses delivered in a given time period. A controller that is delivering a large number of voltage signal pulses in a short time will cause rapid movement of a mount body which may be difficult to control. Delivering the same voltage signal pulses at a slow repetition rate allows the user to have more precise control. A voltage signal profile may also be configured to change both the frequency of the voltage signal pulse delivery and the magnitude of motion generated by each pulse over time in order to steadily increase or decrease the speed of the mount body movement. For example, the voltage signal of FIG. 6A shows a series of voltage signal pulses delivered at a slow repetition rate separated by time period $T_{rep}$ with each successive pulse generating more movement of a mount body until the last pulse profile is reached which has a full displacement profile, which has a similar pulse profile to the pulse shown in FIG. 4A. Once a full displacement profile has been reached, the frequency of delivery of the pulses may then be increased to further increase the speed of movement until the frequency reaches the maximum frequency as shown in the voltage signal profile of FIG. 3B. A similar configuration may be used for pulse profiles such as that of FIG. 5B, which is shown in FIG. 6B. For some embodiments, signal pulses having a full displacement profile delivered at a maximum frequency may generate movement of a mount body at a speed of about 0.1 mm/sec to about 1 mm/sec.

A controller 44 that uses these voltage signal profiles and methods discussed above allows a user to initiate actuation of the piezoelectric inertia driver 10 and subsequent movement of a mount body with small displacement pulses at a low repetition rate. If the actuation is continued, the displacement of each successive pulse may be increased until a full displacement pulse profile is reached, at which point, the controller may start to increase the repetition rate of the full displacement pulses delivered. The repetition rate for some embodiments may be increased from a starting slow repetition rate of about 2 Hz to about 2 Hz, and increased to a more rapid repetition rate of about 0.5 kHz to about 2 kHz.

Figure 7:
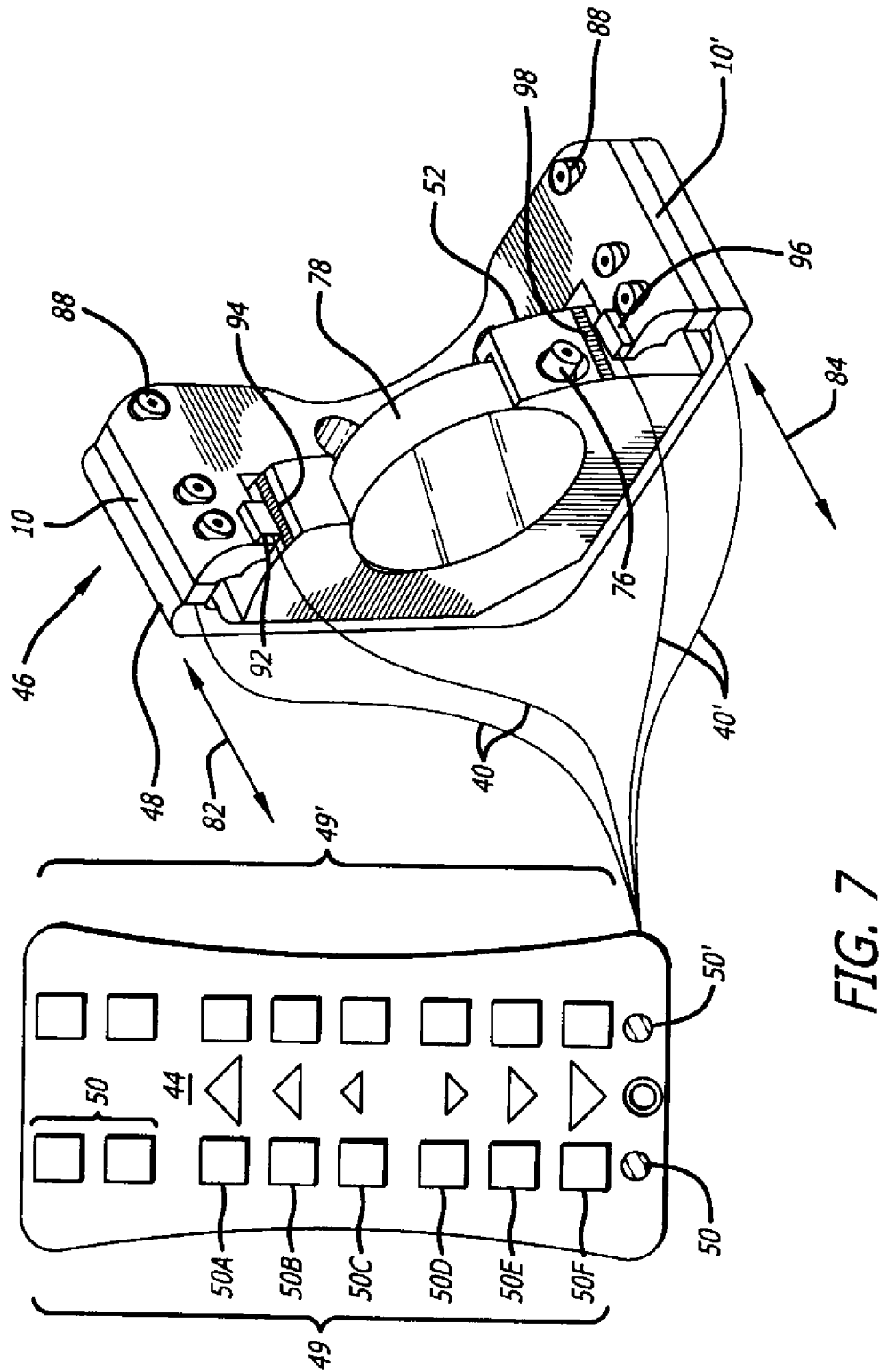
FIG. 7 is a perspective view of an embodiment of a kinematic mount for optical adjustment having a first piezoelectric inertia driver and a second piezoelectric inertia driver.
Figure 8:
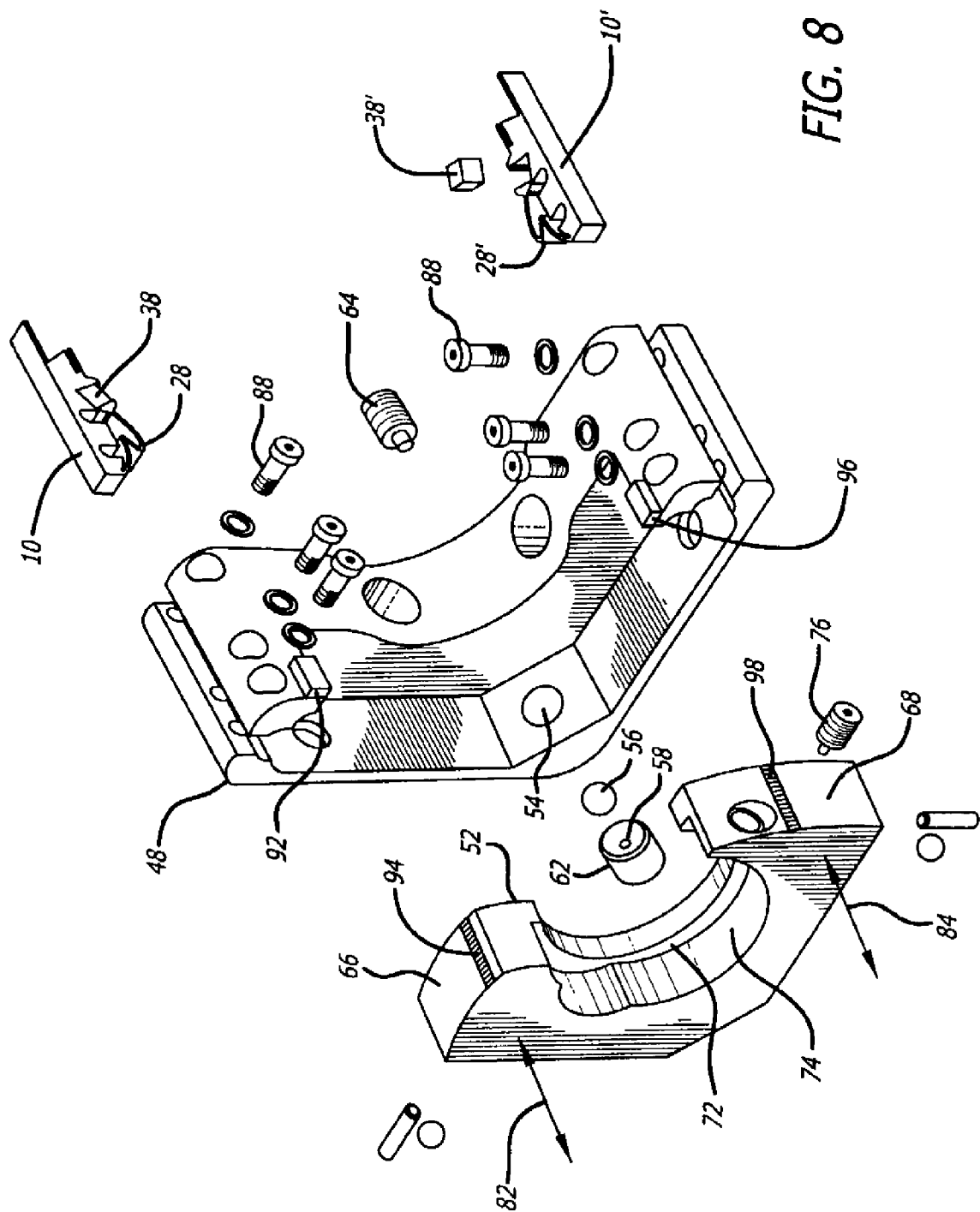
FIG. 8 is an exploded view of the kinematic mount embodiment for optical adjustment of FIG. 7.

Referring to FIGS. 7 and 8, a mount for optical adjustment 46 is shown that is configured to adjust an optical element by double axis rotation. The mount for optical adjustment 46 includes a first mount body 48 that provides a base and a second mount body 52 which pivots relative to the first mount body 48 at a pivot point 54 disposed between the first mount body 48 and second mount body 52. The pivot point 54 for the embodiment' shown is a single ball bearing 56 disposed between a detent 58 of an adjustable barrel 62 that may be secured to the first mount body 48 by a set screw 64 and a detent (not shown) in the second mount body 52. The second mount body 52 also has a first drive surface 66 with a constant radius of curvature relative to the pivot point 54 and a second drive surface 68 with a constant radius of curvature relative to the pivot point 54. The detent in the second mount body 48 is disposed between the first drive surface 66 and the second drive surface 68 on an outer edge of the second mount body 52. The second mount body 52 also has a central aperture 72 disposed through it which allows light to pass through the middle of the second mount body 52.

The second mount body 52 is configured to mount an optical element thereto by means of an optical element mounting recess 74 is disposed about the central aperture 72 and has a set screw 76 for holding an optical element, such as the lens 78, in place. Although shown with a lens 78 mounted in the mounting recess 74, any of the optical elements discussed above may also be so mounted. In addition, the second mount body 52 may be configured to mount an optical element thereto by any other suitable means. For example, an optical element may be bonded to the second mount body 52, held in place by fasteners such as screws or bolts, have mounting locations such as threaded holes disposed thereon suitable for directly mounting an optical element or for mounting a bracket or other device that is suitable for mounting an optical element. The first mount body 48 and second mount body 52 may be made from any suitable high strength material with sufficient thermal stability. Materials such as aluminum, steel, including stainless steel, composites and the like may be used. The transverse dimensions of the first mount body 48 may be about 10 mm to about 200 mm, for some embodiments.

A first piezoelectric inertia driver 10 is configured to impart relative movement between the first mount body 48 and the second mount body 52 in a first axis direction as shown by arrows 82, and includes a drive surface 28 which is frictionally engaged with the first drive surface 66 of the second mount body 52. A second piezoelectric inertia driver 10' is configured to impart relative movement between the first mount body 48 and the second mount body 52 in a second axis direction as indicated by arrows 84, and includes a drive surface 28' which is frictionally engaged with a second drive surface 68 of the second mount body 52. The first and second piezoelectric inertia drivers 10 and 10' are held in place to slots 86 in the first mount body 48 by a plurality of fasteners, such as screws 88. In the embodiment shown, the first and second piezoelectric inertia drivers 10 and 10' are disposed substantially opposite a center of the central aperture 72 of the second mount body 52. For some embodiments, the drive surfaces 28 and 28' of the piezoelectric inertia drivers 10 and 10', respectively, may be hard dry surfaces configured to engage a hard dry surface of the first and second drive surfaces 66 and 68 of the second mount body 52. It may be useful for some embodiments for the frictional engagement to be arranged with dissimilar materials, such as dissimilar metals, to prevent galling or other problems associated with frictional engagement of similar materials or metals. For example, in some embodiments, the drive surfaces 28 and 28' may include a smooth dry steel surface, and the drive surfaces 66 and 68 may include smooth dry hard anodized aluminum surfaces. Other surfaces may include ceramic surfaces, composite surfaces and the like.

Each piezoelectric inertia driver 10 and 10' may be controlled by a single controller 44 or two separate controllers 44, in communication with respective piezoelectric members 38 and 38' thereof, in order to apply a desired amount of adjustment to each piezoelectric inertia driver 10 and 10' and corresponding rotational axis of the second mount body 52. FIG. 7 illustrates an embodiment of controller 44 having 2 columns of control buttons 49 and 49' for controlling the parameters of a drive signal delivered to the piezoelectric inertia drivers 10 and 10'. Each column of buttons 49 and 49' corresponds to a separate control channel, indicated at the bottom of each respective row of buttons by channel number markers 50 and 50', which may be used to control one or more corresponding piezoelectric inertia drivers 10 or 10'. For the embodiment shown, a separate conductor harness 40 and 40' may be in communication between the controller 44 and each respective piezoelectric inertia driver 10 and 10' so that each channel or column of buttons 49 and 49' corresponds to and controls a separate corresponding piezoelectric inertia driver 10 and 10'. If an external (or internal) switch (not shown) is in communication with an output of the controller 44, each column of buttons or channel 49 and 49' may be configured to control multiple piezoelectric inertia drivers 10 and 10' in sequence by selectively switching the channel to communicate with a desired piezoelectric inertia driver 10 or 10' in communication with the switch. As discussed above, the controller 44 may be configured to control the displacement of the mount body 52 relative to the piezoelectric inertia drivers 10 and 10' in a variety of ways in order to give the operator the level of control and precision of movement desired. For channel 49, the top 2 buttons 50 and 50' allow an operator to select the magnitude of the minimum step or movement generated by a voltage signal pulse. The lower set of 6 buttons provide for adjustment in each direction, at three different speeds. Button 50A generates fast forward adjustment, button 50B generates forward adjustment at an intermediate speed and button 50C generates slow forward adjustment. Button 50D generates slow reverse adjustment, button 50E generates reverse adjustment at an intermediate speed and button 50F generates fast reverse adjustment. The buttons of channel 49' provide the same levels and direction of adjustment for that channel.

In addition, control of movement of the second mount body 52 may optionally be further enhanced with the availability of position information feedback of the second mount body 52 for the controller 44. Position information may be generated by a first encoder 92 in communication with the controller 44. The first encoder 92 may be disposed adjacent the first piezoelectric inertia driver 10 and be configured to read a first encoder strip 94 disposed adjacent the first drive surface 66. A second encoder 96 in communication with the controller 44 may be disposed adjacent the second piezoelectric inertia driver 10' and be configured to read a second encoder strip 98 disposed adjacent the second drive surface 68. For some embodiments, the first and second encoders 92 and 96 are optical encoders that may determine the position of the second mount body 52 relative to the first mount body 48 to a resolution that substantially corresponds to the displacement resolution of the piezoelectric inertia driver 10. For some embodiments, the displacement resolution, i.e., smallest increment of reliable displacement, for the piezoelectric inertia driver 10 may be about 5 nm to about 20 nm. Encoders 92 and 96, in communication with respective encoder strips 94 and 98, may have a displacement resolution of about of about 5 nm to about 50 micrometers. High-resolution encoder embodiments may have a resolution of about 5 nm to about 20 nm; however, these encoder embodiments are generally expensive. For some embodiments, in order to keep the cost of the encoders 92 and 96 and respective encoder strips 94 and 98 low, low resolution encoders and respective encoder strips may be used in conjunction with a controller algorithm which measures the amount of time taken for constant velocity movement of the mount body 52 between two encoder strip reference points, and extrapolates or interpolates the position of the mount body 52 based on the time and direction of motion. Some embodiments of low cost encoders and encoder strips may have a nominal resolution of about 20 micrometers to about 30 micrometers.

Some controller 44 embodiments may allow the piezoelectric inertia drivers 10 and 10' to operated in a closed loop control manner when used in conjunction with the encoders 92 and 96 and encoder strips 94 and 98. In such a configuration, an adjustment to position may be input by an operator into the controller 44 and a resulting displacement signal transmitted to the piezoelectric member 38 and 38' from the controller 44. As the piezoelectric inertia drivers 10 and 10' actuate translation in response to the displacement signal from the controller 44, the physical movement of a body, such as the second mount body 52, being displaced by the drive surface 28 of the piezoelectric inertia drivers 10 and 10' is measured by the encoders 92 and 96. When the displaced body 52 reaches the position input by the operator, the displacement signal to the piezoelectric inertia drivers 10 and 10' may be terminated by the CPU of the controller 44.

Figure 9:
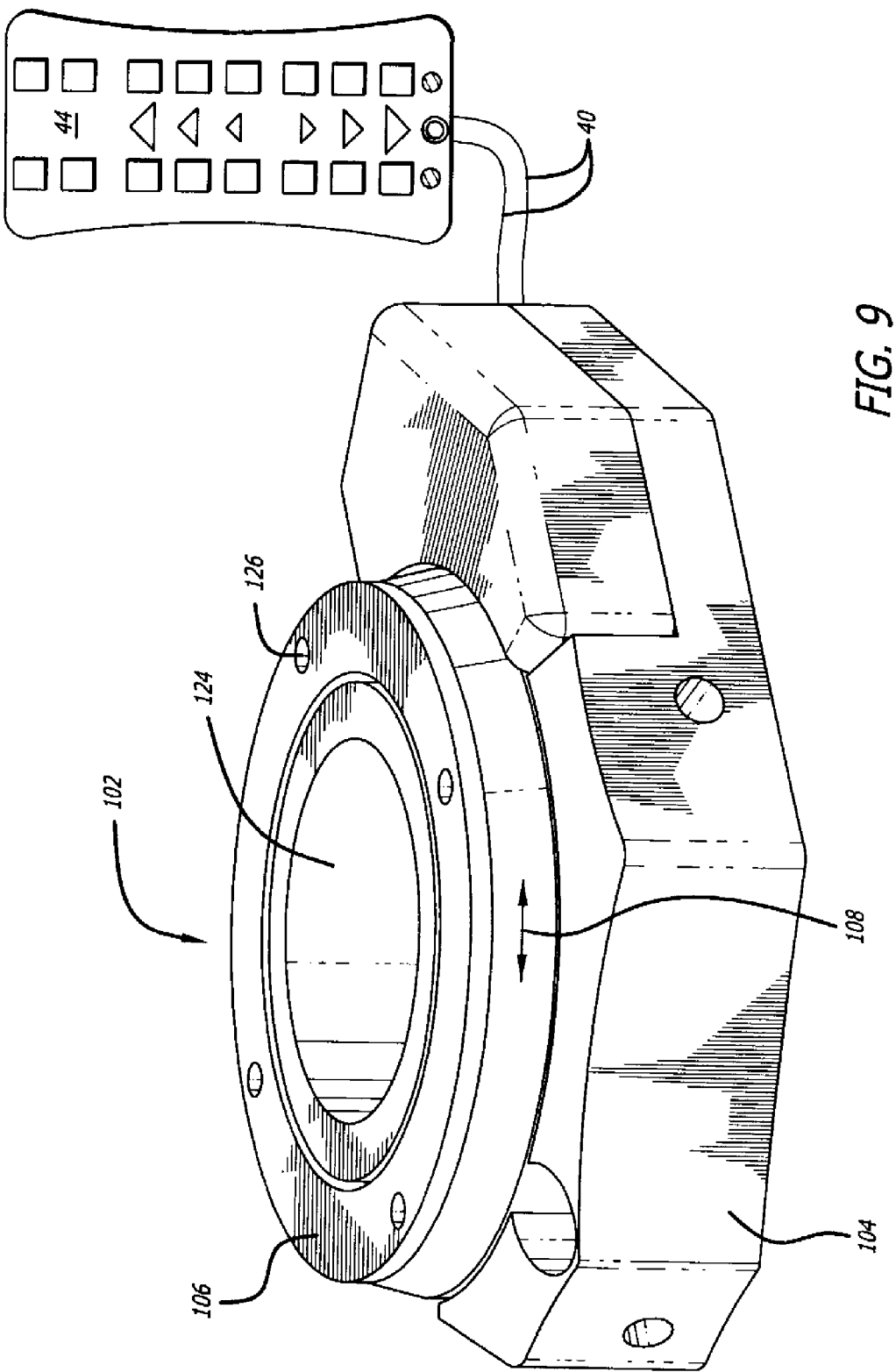
FIG. 9 is a perspective view of an embodiment of a rotary mount having a piezoelectric inertia driver.
Figure 10:
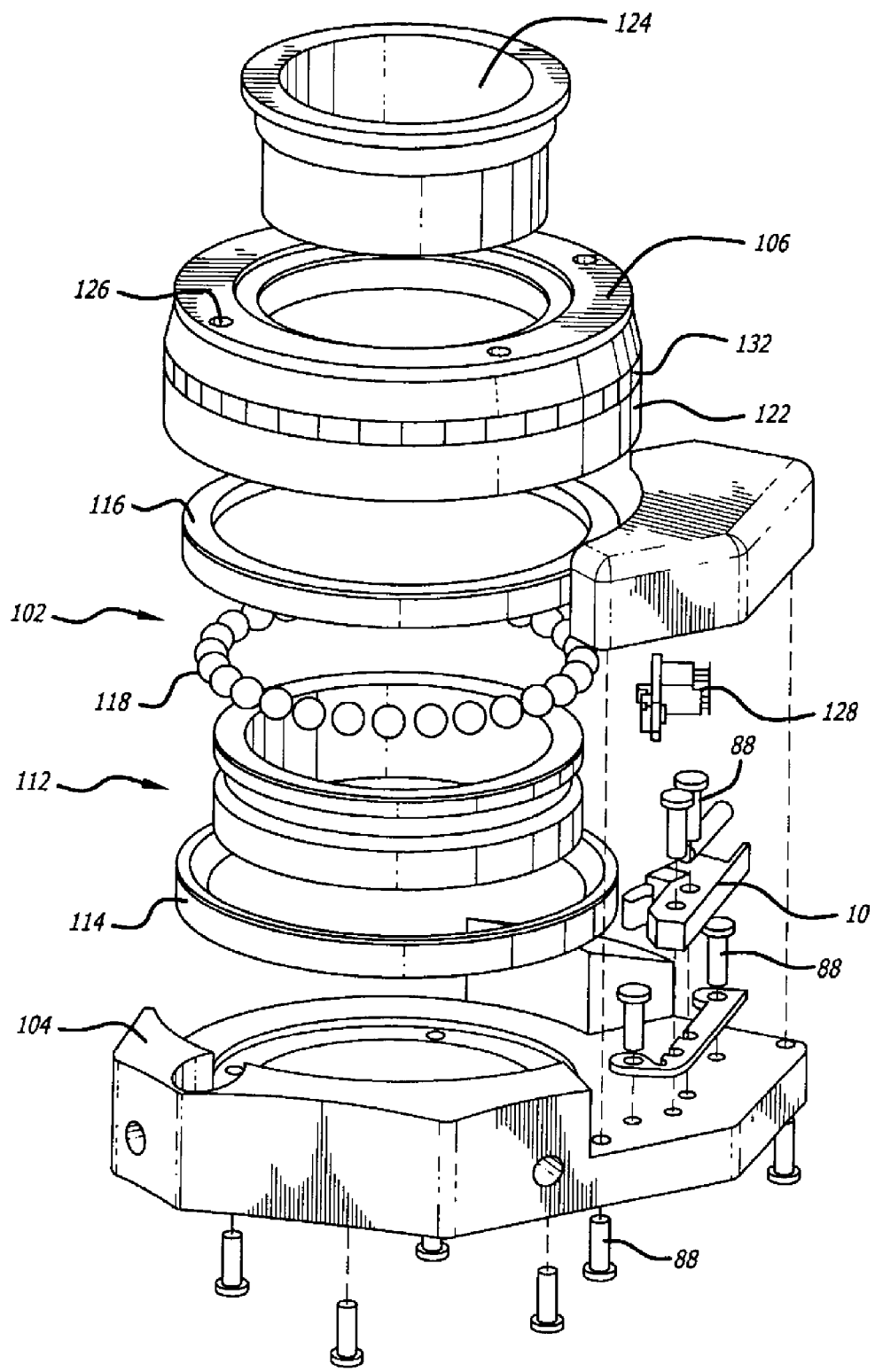
FIG. 10 is an exploded view of the rotary mount embodiment of FIG. 9.
Figure 11:
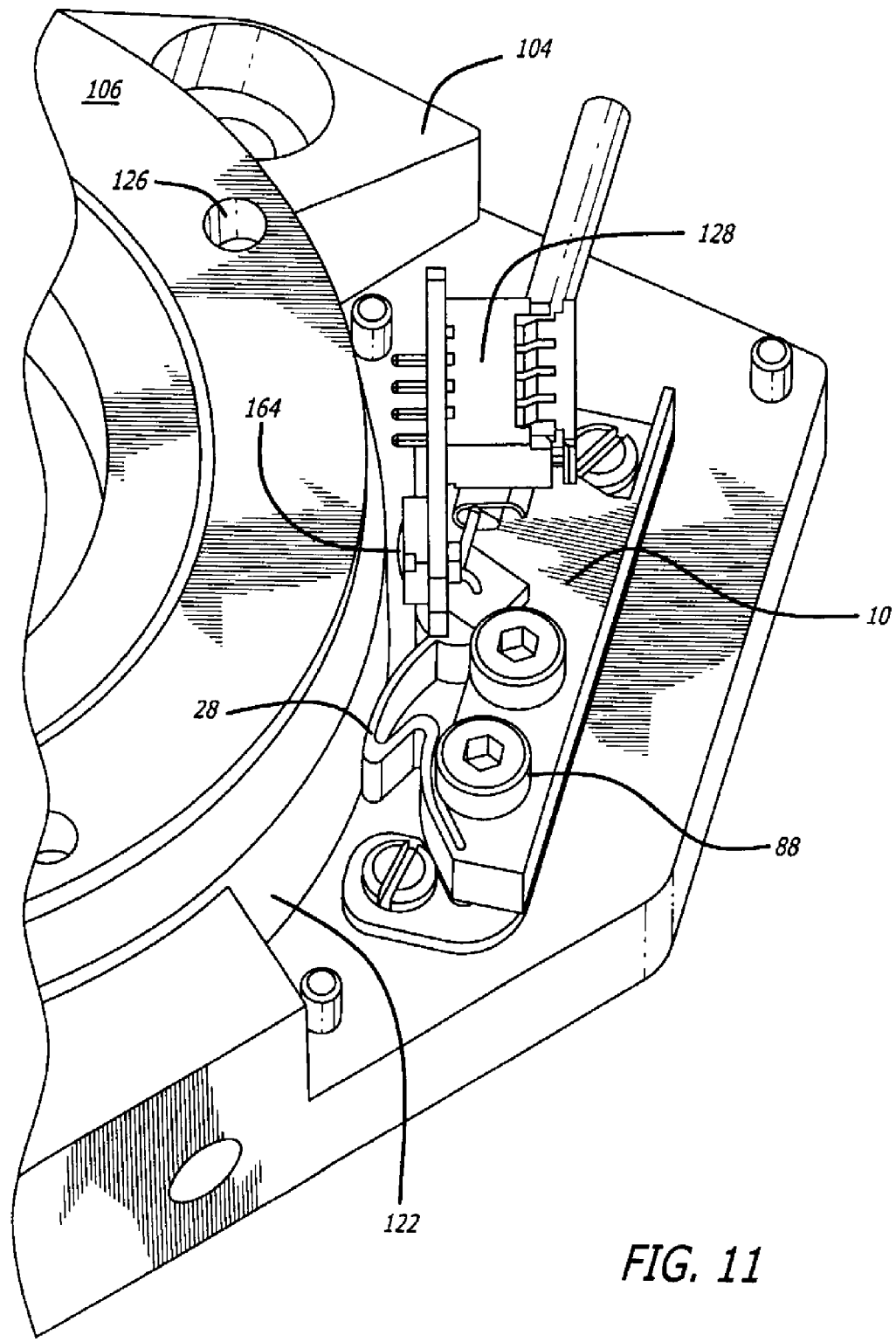
FIG. 11 is an enlarged view in partial section of the piezoelectric inertia driver and encoder of the rotary mount embodiment of FIG. 9.

Referring to FIGS. 9-11, a rotary mount 102 for optical adjustment using a piezoelectric inertia driver 10 is shown. The rotary mount 102 includes a first mount body 104 and a second mount body 106 which rotates about a single axis in a direction of rotation, as indicated by arrows 108, relative to the first mount body 104 in a rotational direction. For the embodiment shown, the relative rotational movement between the first mount body 104 and the second mount body 106 is facilitated by a ball bearing assembly or guide 112 having a first rotational bearing race 114 in fixed relation to the first mount body 104, a second bearing race 116 in fixed relation to the second mount body 106 configured to mate with the first bearing race 114 and a plurality of ball bearings 118 disposed between the mating first and second bearing races 114 and 116. Although the assembly is shown with a ball bearing assembly 112 which rotationally couples the first mount body 104 to the second mount body 106, any other suitable low friction guide assembly may be used that provides for precise rotational movement between the mount bodies 104 and 106. For some embodiments, a high precision bushing or bushings, needle bearing assembly, journal or the like may be used in place of the ball bearing assembly 112. The piezoelectric inertia driver 10 is configured to impart relative rotational movement between the first mount body 104 and the second mount body 106 in the rotational direction. The drive surface 28 of the piezoelectric inertia driver 10 is frictionally engaged with a drive surface 122 of the second mount body 106.

The second mount body 106 includes a central aperture 124 and is configured to secure an optical element thereto. Although shown with a plurality of threaded holes 126 for mounting of an optical element or suitable bracket (not shown) for doing the same, any of the optical elements discussed above may also be mounted by any other suitable means. For example, and optical element may be bonded to the second mount body 106, held in place by fasteners such as screws or bolts and the like. The first mount body 104 and second mount body 106 may be made from any suitable high strength material with sufficient thermal stability. Materials such as aluminum, steel, including stainless steel, composites and the like may be used. The transverse dimensions of the first mount body 104 may be about 10 mm to about 200 mm, for some embodiments.

The piezoelectric inertia driver 10 may be controlled by a controller 44 in communication with the piezoelectric member 38 of the piezoelectric inertia driver 10, in order to apply a desired amount of adjustment to the piezoelectric inertia driver 10 and corresponding rotational axis of the second mount body 106. The mount embodiment 102 shown allows for an unlimited number or rotations about the axis of rotation in the direction indicated by arrows 108. An optional encoder 128 in communication with the controller 44 may be disposed adjacent the piezoelectric inertia driver 10 and be configured to read an encoder strip 132 disposed adjacent the drive surface 122 of the second mount body 106. For some embodiments, the encoder 128 is an optical encoder that may determine the position of the second mount body relative to the first mount body 104. The resolution of the encoder may be configured to correspond to the displacement resolution of the piezoelectric inertia driver 10. The encoder 128, in communication with respective encoder strip 132, may have a displacement resolution which is the same as or similar to that of the encoders 92 and 96 discussed above.

Also, as discussed above, some controller 44 embodiments may allow the piezoelectric inertia driver 10 to operated in a closed loop control manner when used in conjunction and communication with the encoder 128 and encoder strip 132. In such a configuration, an adjustment to position may be input by an operator into the controller 44 and a resulting angular displacement signal transmitted to the piezoelectric member 38 from the controller 44. As the piezoelectric inertia driver 10 actuates rotation in response to the angular displacement signal from the controller, the physical movement of the second mount body 106 being rotated by the drive surface 28 of the piezoelectric inertia driver 10 is measured by the encoder 128 and transmitted to the controller 44. When the rotated mount body 106 reaches the position relative to the first mount body 104 input by the operator, the displacement signal to the piezoelectric inertia driver 10 may be terminated by the CPU of the controller 44.

Figure 12:
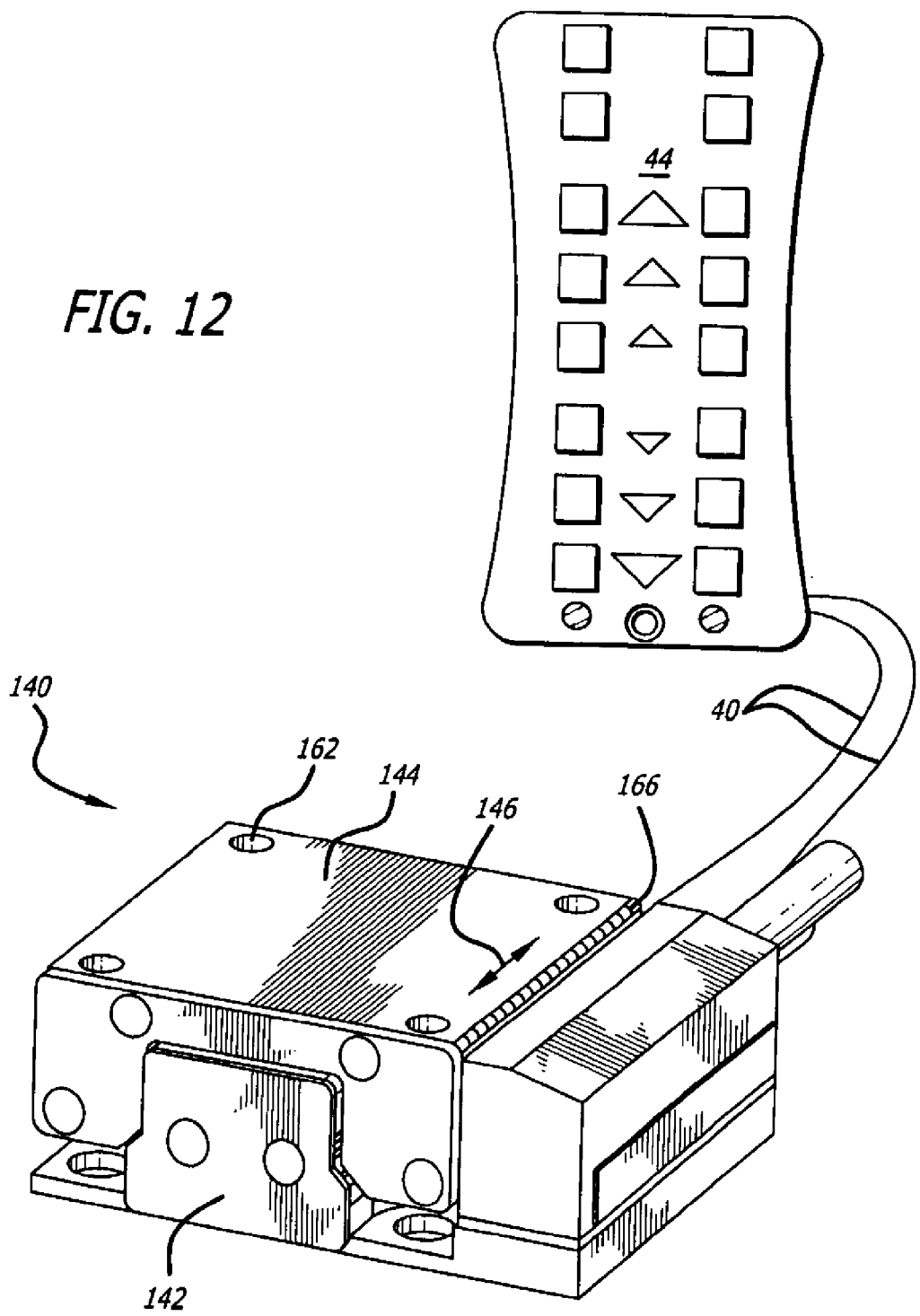
FIG. 12 is a perspective view of an embodiment of a translation mount having a piezoelectric inertia driver.
Figure 13:
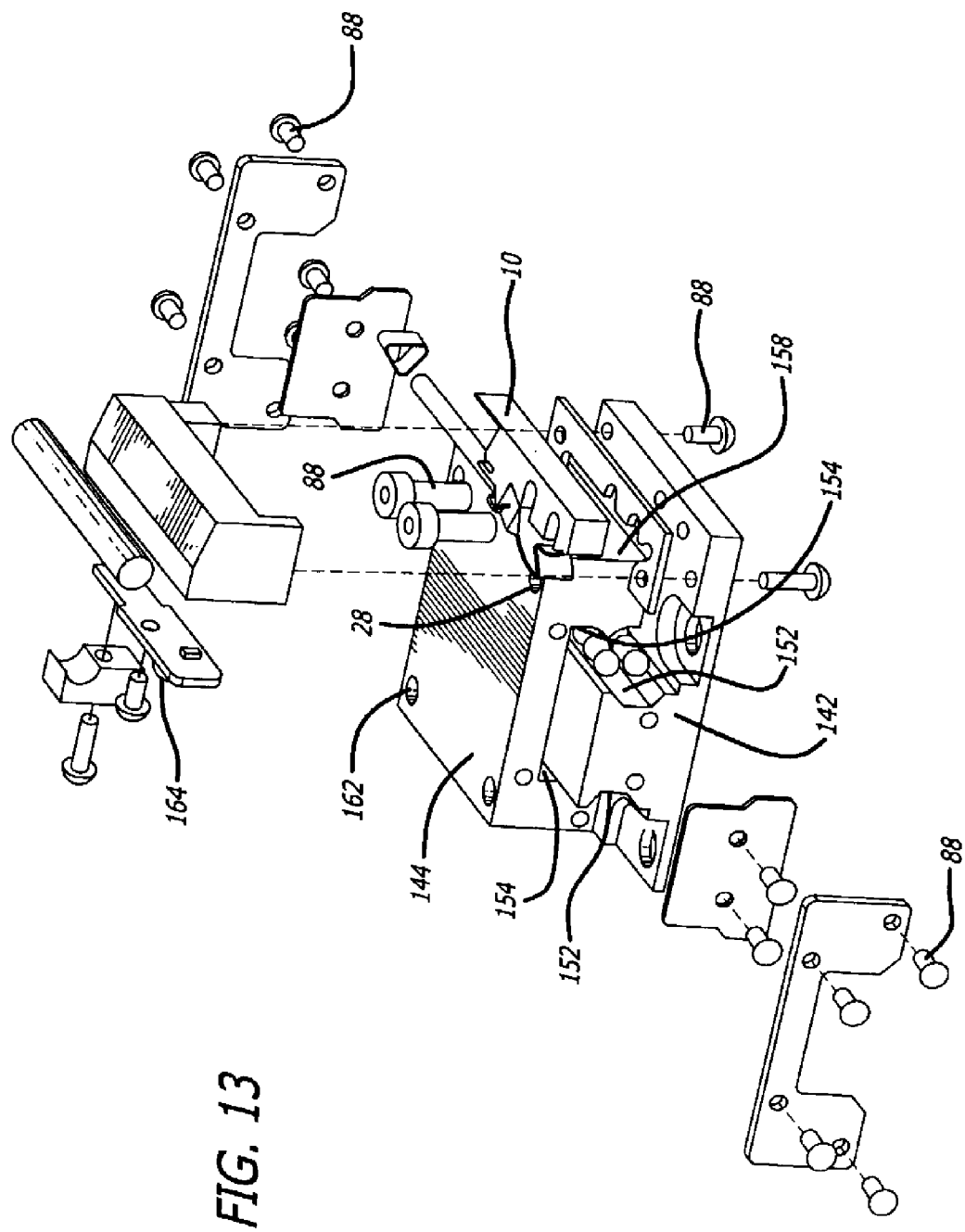
FIG. 13 is an exploded view of the translation mount embodiment of FIG. 12.
Figure 14:
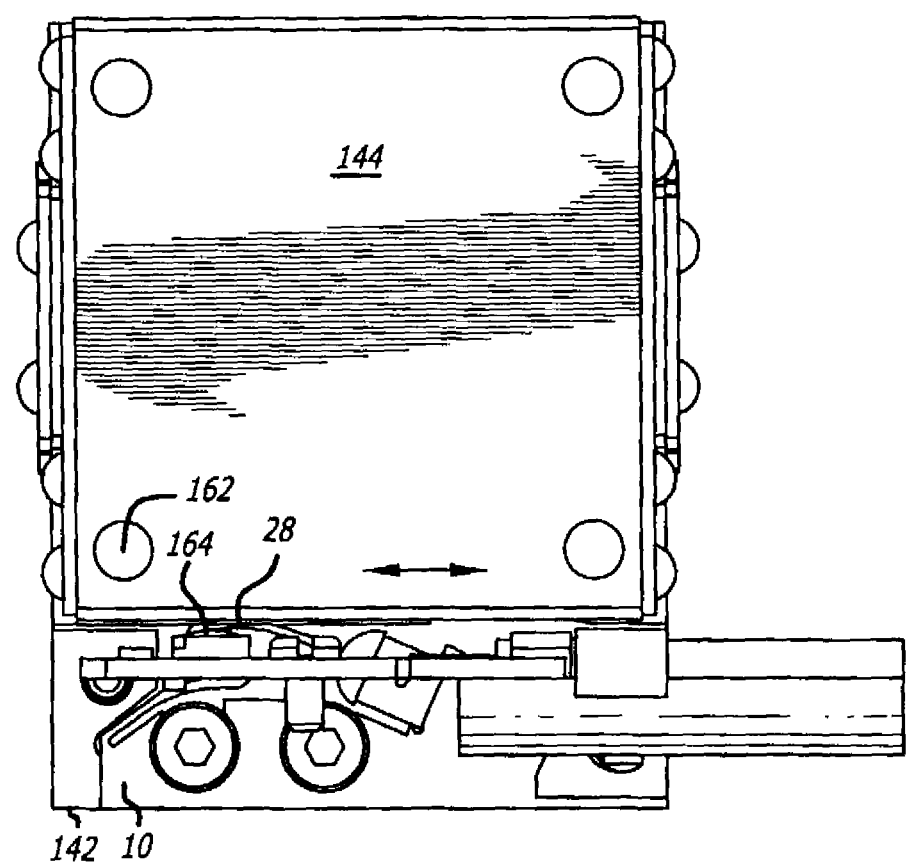
FIG. 14 is an enlarged top view in partial section of the translation mount embodiment of FIG. 12.

Referring to FIGS. 12-14, a translation mount 140 for optical adjustment using a piezoelectric inertia driver 10 is shown. The translation mount 140 includes a first mount body 142 and a second mount body 144 which translates relative to the first mount body 142 in a linear direction, as indicated by arrows 146. For the embodiment shown, the relative translational movement between the first mount body 142 and the second mount body 144 is facilitated by a ball bearing assembly 148 having a pair of inner bearing races 152 in fixed relation to the first mount body 142, a second pair of outer bearing races 154 in fixed relation to the second mount body 144 and configured to mate with the first pair of inner bearing races 152. A plurality of ball bearings 156 are disposed between the mating first and second pairs of bearing races 152 and 154 to provide smooth and precise linear motion between the first and second mount bodies 142 and 144 with a minimum of friction. Although the assembly is shown with a ball bearing assembly 148 which couples the first mount body 142 to the second mount body 144, any other suitable low friction guide assembly may be used that provides for precise linear movement between the mount bodies 142 and 144. For some embodiments, a high precision bushing or bushings, needle bearing assembly, journals or the like may be used in place of the ball bearing assembly 148. The piezoelectric inertia driver 10 is configured to impart relative translational movement between the first mount body 142 and the second mount body 144 in a linear direction. The drive surface 28 of the piezoelectric inertia driver 10 is frictionally engaged with a drive surface 158 of the second mount body 144.

The second mount body 144 is configured to secure an optical element thereto. Although shown with a plurality of threaded holes 162 for mounting of an optical element or suitable bracket (not shown) for doing the same, any of the optical elements discussed above may also be mounted by any other suitable means. For example, and optical element may be bonded to the second mount body 144, held in place by fasteners such as screws or bolts and the like. The first mount body and second mount body may be made from any suitable high strength material with sufficient thermal stability. Materials such as aluminum, steel, including stainless steel, composites and the like may be used. The transverse dimensions of the first mount body 142 may be about 10 mm to about 200 mm, for some embodiments.

The piezoelectric inertia driver 10 may be controlled by controller 44 in communication with the piezoelectric member 38 of the piezoelectric inertia driver 10, in order to apply a desired amount of adjustment to the piezoelectric inertia driver 10 and corresponding linear movement of the second mount body 144. An optional encoder 164 in communication with the controller 44 may be disposed adjacent the piezoelectric inertial actuator inertia driver 10 and be configured to read an encoder strip 166 disposed adjacent the drive surface 158 of the second mount body 144. For some embodiments, the encoder 164 is an optical encoder that may determine the position of the second mount body 144 relative to the first mount body 142. The resolution of the encoder 164 may be configured to substantially correspond to the displacement resolution of the piezoelectric inertia driver 10. For some embodiments, encoder 164, in communication with encoder strip 166, may have a displacement resolution that is the same as or similar to the resolution of the encoders 92 and 96 discussed above. The piezoelectric inertia driver 10 may be operated in a closed loop control manner when used in conjunction with the encoder 164 and encoder strip 166. An adjustment to position may be input by an operator into the controller 44 and a resulting displacement signal transmitted to the piezoelectric member 38 from the controller 44. As the piezoelectric inertia driver 10 actuates linear displacement of the second mount body 144 relative to the first mount body 142 in response to the displacement signal from the controller, the physical movement of the second mount body 144 being displaced by the drive surface 28 of the piezoelectric inertia driver 10 is measured by the encoder 164 and transmitted to the controller 44. When the displaced second mount body 144 reaches the position relative to the first mount body 142 input by the operator, the displacement signal to the piezoelectric inertia driver 10 may be terminated by the CPU of the controller 44.

What is claimed is:

1. A piezoelectric inertia driver for optical adjustment, comprising:
   a rigid body portion having a first piezoelectric member mount surface and a bottom surface;
   a continuous and flexible resilient member having
      a first end which includes a second piezoelectric member mount surface,
      a drive surface portion having a drive surface, the drive surface extending furthest from the bottom surface allowing the drive surface to engage a surface of a body to be driven,
      an axially rigid portion disposed between and secured to the drive surface portion and the first end,
      an S-shaped resilient portion extending from the from the drive surface portion, the S-shaped portion having a first bend under the drive surface portion towards the first end portion and a second bend redirecting the S-shaped portion towards a second end portion, and
      the second end portion being disposed between and secured to the S-shaped resilient portion and the rigid body portion; and
   a piezoelectric member disposed between and secured to the first and second mount surfaces.

2. The piezoelectric inertia driver of claim 1 wherein the rigid body portion and flexible resilient member comprise a monolithic structure formed from a single piece of resilient material.

3. The piezoelectric inertia driver of claim 2 wherein the single piece of resilient material comprises resilient metal.

4. The piezoelectric inertia driver of claim 3 wherein the resilient metal comprises spring steel.

5. The piezoelectric inertia driver of claim 1 wherein the second end portion is secured to the rigid body portion such that torque and axial forces may be transmitted between the second end portion of the resilient member and the rigid body portion.

6. The piezoelectric inertia driver of claim 1 wherein the piezoelectric member comprises a substantially cubic configuration.

7. The piezoelectric inertia driver of claim 1 further comprising a piezoelectric inertia driver system for optical adjustment that further includes a controller having a CPU electrically coupled to piezoelectric member.

8. The piezoelectric inertia driver of claim 1 wherein the rigid body portion further comprises mounting slots or holes.

9. The piezoelectric inertia driver of claim 1 wherein the S-shaped portion is configured to cancel torque from the resilient member to the piezoelectric member.

10. A mount for optical adjustment, comprising:
    a first mount body;
    a second mount body which is configured to secure an optical element thereto and which is movable relative to the first mount body in at least one adjustable degree of freedom; and
    a piezoelectric inertia driver configured to impart a relative movement in an adjustable degree of freedom between the first mount body and the second mount body, including;
       a rigid body portion having a first piezoelectric member mount surface and a bottom surface;
       a continuous and flexible resilient member having
          a first end which includes a second piezoelectric member mount surface,
          a drive surface portion having a drive surface, the drive surface extending furthest from the bottom surface allowing the drive surface to engage a surface of a body to be driven,
          an axially rigid portion disposed between and secured to the drive surface portion and the first end,
          an S-shaped resilient portion extending from the from the drive surface portion, the S-shaped portion having a first bend under the drive surface portion towards the first end portion and a second bend redirecting the S-shaped portion towards a second end portion, and
          the second end portion being disposed between and secured to the S-shaped resilient portion and the rigid body portion; and
       a piezoelectric member disposed between and secured to the first and second mount surfaces.

11. The mount of claim 10 wherein the rigid body portion of the piezoelectric inertia driver is secured to the first mount body and the drive surface is frictionally engaged with the second mount body.

12. The mount of claim 10 wherein the rigid body portion of the piezoelectric inertia driver is secured to the second mount body and the drive surface is frictionally engaged with the first mount body.

13. The mount of claim 10 further comprising a mount system for optical adjustment that further comprises a controller having a CPU electrically coupled to the piezoelectric member.

14. The mount system of claim 13 further comprising an encoder configured to measure relative movement between the first mount body and the second mount body which is in communication with controller.

15. The mount system of claim 14 wherein the encoder comprises an optical encoder.

16. The mount of claim 10 wherein the rigid body portion of the piezoelectric inertia driver further comprises mounting slots or holes.

17. The mount of claim 10 wherein the S-shaped portion of the resilient member is configured to cancel torque from the resilient member to the piezoelectric member.

18. The mount of claim 10 wherein the rigid body portion and flexible resilient member comprise a monolithic structure formed from a single piece of resilient material.

19. The mount of claim 18 wherein the single piece of resilient material comprises resilient metal.

20. The mount of claim 19 wherein the resilient metal comprises spring steel.

21. The mount of claim 10 wherein the second end portion is secured to the rigid body portion such that torque and axial forces may be transmitted between the second end portion of the resilient member and the rigid body portion.

22. The mount of claim 10 wherein the second mount body comprises a central aperture unobstructed by the first mount body which is configured to allow a passage of light therethrough.

23. A mount for optical adjustment, comprising:
    a first mount body;

a second mount body which is configured to secure an optical element thereto, which pivots relative to the first mount body at a multi-axis pivot point disposed between the first mount body and second mount body and which has a first drive surface corresponding to a first axis direction with a substantially constant radius of curvature relative to the pivot point and a second drive surface corresponding to a second axis direction which has a substantially constant radius of curvature relative to the pivot point; and a first piezoelectric inertia driver configured to impart relative movement between the first mount body and the second mount body in the first axis direction, including:
　a rigid body portion having a first piezoelectric member mount surface;
　a continuous and flexible resilient member having
　　a first end which includes a second piezoelectric member mount surface,
　　a drive surface portion having a drive surface which is frictionally engaged with the first drive surface of the second mount body,
　　an axially rigid portion disposed between and secured to the drive surface portion and the first end,
　　an S-shaped resilient portion extending from the drive surface portion, and
　　a second end portion being disposed between and secured to the S-shaped resilient portion and the rigid body portion, and
　a piezoelectric member disposed between and secured to the first and second mount surfaces; and a second piezoelectric inertia driver configured to impart relative movement between the first mount body and the second mount body in the second axis direction, including:
　a rigid body portion having a first piezoelectric member mount surface;
　a continuous and flexible resilient member having a first end which includes a second piezoelectric member mount surface,
　　a drive surface portion having a drive surface which is frictionally engaged with a second drive surface of the second mount body,
　　an axially rigid portion disposed between and secured to the drive surface portion and the first end,
　　an S-shaped resilient portion extending from the from the drive surface portion, and
　　a second end portion being disposed between and secured to the S-shaped resilient portion and the rigid body portion; and
　a piezoelectric member disposed between and secured to the first and second mount surfaces.

24. The mount of claim 23 further comprising a mount system that further comprises a controller having a CPU electrically coupled to piezoelectric member.

25. The mount system of claim 24 further comprising an encoder configured to measure relative movement between the first mount body and the second mount body which is in communication with controller.

26. The mount system of claim 25 wherein the encoder comprises an optical encoder.

27. The mount of claim 23 wherein the rigid body portion of the first and second piezoelectric inertia drivers further comprises mounting slots or holes.

28. The mount of claim 23 wherein the S-shaped portion of the resilient member is configured to cancel torque from the resilient member to the piezoelectric member.

29. The mount of claim 23 wherein the rigid body portion and flexible resilient member comprise a monolithic structure formed from a single piece of resilient material.

30. The mount of claim 29 wherein the single piece of resilient material comprises resilient metal.

31. The mount of claim 30 wherein the resilient metal comprises spring steel.

32. The mount of claim 31 wherein the second end portions of the first and the second piezoelectric inertia drivers are secured to the respective rigid body portions such that torque and axial forces may be transmitted between the second end portions of the resilient members and the respective rigid body portions.

33. The mount of claim 23 wherein the pivot point comprises a ball bearing disposed in a detent which is compressed into engagement by the drive surface of the first and second piezoelectric inertia drivers.

34. The mount of claim 23 wherein the second mount body comprises a central aperture unobstructed by the first mount body which is configured to allow a passage of light therethrough.

35. A rotary mount for optical adjustment, comprising
a first mount body;
a second mount body which is configured to secure an optical element thereto and which rotates about a single axis of rotation relative to the first mount body in a rotational direction; and
a piezoelectric inertia driver configured to impart relative rotational movement between the first mount body and the second mount body in the rotational direction, including:
　a rigid body portion having a first piezoelectric member mount surface and a bottom surface;
　a continuous and flexible resilient member having
　　a first end which includes a second piezoelectric member mount surface,
　　a drive surface portion having a drive surface, the drive surface extending furthest from the bottom surface allowing the drive surface to engage a surface of a body to be driven,
　　an axially rigid portion disposed between and secured to the drive surface portion and the first end,
　　an S-shaped resilient portion extending from the from the drive surface portion, the S-shaped portion having a first bend under the drive surface portion towards the first end portion and a second bend redirecting the S-shaped portion towards a second end portion, and
　　the second end portion being disposed between and secured to the S-shaped resilient portion and the rigid body portion; and
　a piezoelectric member disposed between and secured to the first and second mount surfaces.

36. The rotary mount of claim 35 further comprising a rotary mount system that further comprises a controller having a CPU electrically coupled to piezoelectric member.

37. The rotary mount system of claim 36 further comprising an encoder configured to measure relative movement between the first mount body and the second mount body which is in communication with the controller.

38. The rotary mount system of claim 37 wherein the encoder comprises an optical encoder.

39. The rotary mount of claim 35 wherein the rigid body portion of the piezoelectric inertia driver further comprises mounting slots or holes.

40. The rotary mount of claim 35 wherein the S-shaped portion of the resilient member is configured to cancel torque from the resilient member to the piezoelectric member.

41. The rotary mount of claim 35 wherein the rigid body portion and flexible resilient member comprise a monolithic structure formed from a single piece of resilient material.

42. The rotary mount of claim 41 wherein the single piece of resilient material comprises resilient metal.

43. The rotary mount of claim 42 wherein the resilient metal comprises spring steel.

44. The rotary mount of claim 35 wherein the second end portion is secured to the rigid body portion such that torque and axial forces may be transmitted between the second end portion of the resilient member and the rigid body portion.

45. The rotary mount of claim 35 wherein the first mount body comprises a rotational bearing race, the second mount body comprises a bearing race configured to mate with the bearing race of the first mount body and further comprising a plurality of ball bearings disposed between the bearing races.

46. The mount of claim 35 wherein the second mount body comprises a central aperture unobstructed by the first mount body which is configured to allow a passage of light therethrough.

47. A translation mount for optical adjustment, comprising:
a first mount body;
a second mount body which is configured to secure an optical element thereto and which translates relative to the first mount body in a linear direction; and
a piezoelectric inertia driver configured to impart relative linear movement between the first mount body and the second mount body in the linear direction, including:
a rigid body portion having a first piezoelectric member mount surface and a bottom surface;
a continuous and flexible resilient member having
a first end which includes a second piezoelectric member mount surface,
a drive surface portion having a drive surface, the drive surface extending furthest from the bottom surface allowing the drive surface to engage a surface of a body to be driven,
an axially rigid portion disposed between and secured to the drive surface portion and the first end,
an S-shaped resilient portion extending from the from the drive surface portion, the S-shaped portion having a first bend under the drive surface portion towards the first end portion and a second bend redirecting the S-shaped portion towards a second end portion, and
the second end portion being disposed between and secured to the S-shaped resilient portion and the rigid body portion; and
a piezoelectric member disposed between and secured to the first and second mount surfaces.

48. The translation mount of claim 47 further comprising a translation mount system that further comprises a controller having a CPU electrically coupled to piezoelectric member.

49. The translation mount system of claim 48 further comprising an encoder configured to measure relative movement between the first mount body and the second mount body which is in communication with controller.

50. The translation mount system of claim 49 wherein the encoder comprises an optical encoder.

51. The translation mount of claim 47 wherein the rigid body portion of the piezoelectric inertia driver further comprises mounting slots or holes.

52. The translation mount of claim 47 wherein the S-shaped portion of the resilient member is configured to cancel torque from the resilient member to the piezoelectric member.

53. The translation mount of claim 47 wherein the rigid body portion and flexible resilient member comprise a monolithic structure formed from a single piece of resilient material.

54. The translation mount of claim 53 wherein the single piece of resilient material comprises resilient metal.

55. The translation mount of claim 54 wherein the resilient metal comprises spring steel.

56. The translation mount of claim 47 wherein the second end portion is secured to rigid body portion such that torque and axial forces may be transmitted between the second end portion of the resilient member and the rigid body portion.

57. The translation mount of claim 47 wherein the first mount body comprises a pair of linear bearing races, the second mount body comprises a pair of linear bearing races configured to mate with the pair of linear bearing races of the first mount body and further comprising a plurality of ball bearings disposed between the pairs of mating linear bearing races.

* * * * *

UNITED STATES PATENT AND TRADEMARK OFFICE
CERTIFICATE OF CORRECTION

PATENT NO. : 8,520,327 B2  Page 1 of 1
APPLICATION NO. : 12/065083
DATED : August 27, 2013
INVENTOR(S) : Patrick Thomas and Roger Desailly It is certified that error appears in the above-identified patent and that said Letters Patent is hereby corrected as shown below:

In the claims;

Column 15
    Claim 1, line 28 should read:
        "an S-shaped resilient portion extending from"

Column 16
    Claim 10, line 21 should read:
        "an S-shaped resilient portion extending from"

Column 17
    Claim 23, line 45 should read:
        "an S-shaped resilient portion extending from"

Column 18
    Claim 35, line 43 should read:
        "an S-shaped resilient portion extending from"

Column 19
    Claim 47, line 44 should read:
        "an S-shaped resilient portion extending from"

Signed and Sealed this
First Day of March, 2016

Michelle K. Lee
*Director of the United States Patent and Trademark Office*